(12) United States Patent
Purvis, Jr.

(10) Patent No.: US 11,425,887 B1
(45) Date of Patent: Aug. 30, 2022

(54) GAME FEEDER

(71) Applicant: Jerry G. Purvis, Jr., Adel, GA (US)

(72) Inventor: Jerry G. Purvis, Jr., Adel, GA (US)

(*) Notice: Subject to any disclaimer, the term of this patent is extended or adjusted under 35 U.S.C. 154(b) by 531 days.

(21) Appl. No.: 16/257,058

(22) Filed: Jan. 24, 2019

Related U.S. Application Data

(60) Provisional application No. 62/622,055, filed on Jan. 25, 2018.

(51) Int. Cl.
*A01K 5/02* (2006.01)

(52) U.S. Cl.
CPC .................. *A01K 5/0225* (2013.01)

(58) Field of Classification Search
CPC ...... A01K 5/0225; A01K 5/0275; A01K 5/02; A01K 5/001; A01K 5/00; A01K 39/014; A01K 39/00
USPC .............. 119/51.01, 57.91, 57.92, 52.1, 56.1
See application file for complete search history.

(56) References Cited

U.S. PATENT DOCUMENTS

| | | | |
|---|---|---|---|
| 3,195,508 A * | 7/1965 | Lehman | A01K 5/0291 119/51.11 |
| 6,990,925 B2 | 1/2006 | Banks et al. | |
| 7,331,308 B1 | 2/2008 | Smith | |
| 9,655,342 B2 | 5/2017 | Christie | |
| 9,743,641 B1 * | 8/2017 | Attard | A01K 5/0291 |
| 10,201,150 B1 * | 2/2019 | Cottle | A01K 29/005 |
| 2003/0019437 A1 * | 1/2003 | Fore | A01K 5/0225 119/57.92 |
| 2005/0076843 A1 | 4/2005 | Ansaldo | |
| 2010/0307421 A1 * | 12/2010 | Gates | A01K 39/012 119/56.1 |
| 2015/0366162 A1 | 12/2015 | Collins | |
| 2017/0006825 A1 | 1/2017 | Knight | |

* cited by examiner

*Primary Examiner* — Kathleen I Alker
(74) *Attorney, Agent, or Firm* — Schonauer Law LLC; Matthew J. Schonauer

(57) ABSTRACT

A collapsible game feeder apparatus having a feed cavity supported by three or more collapsible leg members wherein the leg members include a fixed member with respect to the feed cavity and a collapsible member that collapses about a pivot point with respect to the fixed member. The fixed member extends below a feed distributor when the apparatus is configured in the collapsed mode such that the feed distributor is protected from the ground and general stresses and strains. The game feed may also be provided with one or more straps enabling easy transportation by a single user to and from remote game areas.

16 Claims, 24 Drawing Sheets

GAME FEEDER

CROSS-REFERENCE TO RELATED APPLICATIONS

This application claims priority to U.S. Provisional Application No. 62/622,055 filed 25 Jan. 2018, the content of which is hereby incorporated by reference as if fully recited herein.

TECHNICAL FIELD

Exemplary embodiments of the present invention relate generally to mechanical devices, and more specifically to devices for remotely dispensing animal feed at predetermined intervals and amounts.

BACKGROUND OF THE INVENTION

Convenient and versatile game feeding solutions have been sought after in the hunting industry for some time. Many known devices involve a structure suitable to support a predetermined amount of game feed above the ground. Some known feeders are configured to hang from natural or artificial support structures, such as tree branches or poles, respectively. Many known devices include a battery powered feed distributor as a means for periodically distributing feed in the area around the game feeder, thereby attracting wild game for observation or hunting purposes.

Despite the many options available to wild game enthusiasts today, users are often forced to choose between several advantages and disadvantages inherent in the known devices. This often may even lead to the necessity of purchasing several different types of devices in order to be prepared for various considerations in a given application, such as the type of game being targeted, the location of the desired deployment, the feeding habits of the local wildlife, and the physical abilities of the user.

For example, in many instances, the targeted game is located remotely from modern conveniences and development. Physical access may be difficult, and may require all-terrain vehicles and long hikes in which a user must personally carry everything needed. Some game may require greater or lesser distribution of the feed intended for the wildlife. In other cases, multiple types of game may be involved, necessitating multiple different approaches for feeding (e.g., distributor height, battery size, hanging or free-standing, etc.).

Some devices, such as that described in connection with U.S. Pat. No. 6,990,925 to Banks et al., provide open feed cavities that are somewhat protected from the elements. However, these types have been found to be generally less desirable than devices which self-apportion the feed stored therein, as it is more likely to become a habitual feeding activity for the game in cases otherwise. Therefore, there is a general need in the art for devices which self-apportion feed in the environment.

Some devices, such as that described in connection with U.S. Pat. No. 7,331,308 to Smith, provide for such self-apportionment in the form of a hangable feed source coupled with an automatic feed distributor. However, these devices require a structure from which to the hang the device, and often may therefore require additional cumbersome elements in environments devoid of natural structures from which the device may be hung. The feed distributor element, also the most susceptible to environmental or animal damage, is left undesirably exposed to the elements and wild animals in both the deployed, active mode and when in storage, as the feed distributor forms the bottom of the overall device. Other devices intended for hanging, such as that described in U.S. Pat. No. 9,655,342 to Christie, also require structures from which to the hang the device, as well as additional equipment such as straps, braces and other such structures. These types also do not provide for 360 degrees of feed distribution, which is often desirable.

Other devices have been disclosed that do not require a hanging structure, but likewise require the transportation, assembly and disassembly of a support structure. Devices such as those described in U.S. Publication No. 2005/0076843 by Ansaldo are collapsible to aid in transportation, but still require multiple elements to be transported to and from the intended feeding site (see also U.S. Publication No. 2015/0366162 by Collins).

It is therefore an unmet need in the prior art for a game feeder device that provides an easily transportable and storable form with no assembly, in a lightweight format and requiring minimal storage space without time-consuming assembly or disassembly. No known references, taken alone or in combination, are seen as teaching or suggesting the presently disclosed game feeder.

BRIEF SUMMARY OF THE INVENTION

Exemplary embodiments of the present disclosure pertain to a collapsible game feeder apparatus having a feed cavity supported by three or more collapsible leg members wherein the leg members include a fixed member with respect to the feed cavity and a collapsible member that collapses about a pivot point with respect to the fixed member. The fixed member extends below a feed distributor when the apparatus is configured in the collapsed mode such that the feed distributor is protected from the ground and general stresses and strains. The game feed may also be provided with one or more straps enabling easy transportation by a single user to and from remote game areas.

An object of the present invention is to provide a low fill-height with a high flinger-height (under four feet versus over three feet). This is provided in the collapsible nature of the presently disclosed invention, which enables the device to be readily filled in the collapsed mode and easily configured in a deployed mode higher from the ground.

An object of the present invention is provided wherein the flinger is protected in all modes, deployed, storage or fill.

An object of the invention is to provide a device that is easy for one person to set up, take down and transport. The disclosed invention is readily portable, and may be transported, deployed and stored by a single person with the feed installed prior to transport.

An object of the present invention is to provide a self-contained apparatus (i.e., with no losable parts or extensive assembly required). The apparatus disclosed is easy to ship in the collapsed mode, and is ready for use upon initial receipt, requiring only the addition of a battery and feed as desired.

An object of the present invention is to provide a large feed capacity without disadvantaging the portability of the apparatus.

An object of the present invention is to provide ready attachability for desirous tools, such as a game camera.

It is an object of this invention to provide a game feeder of the type generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Figure 1:
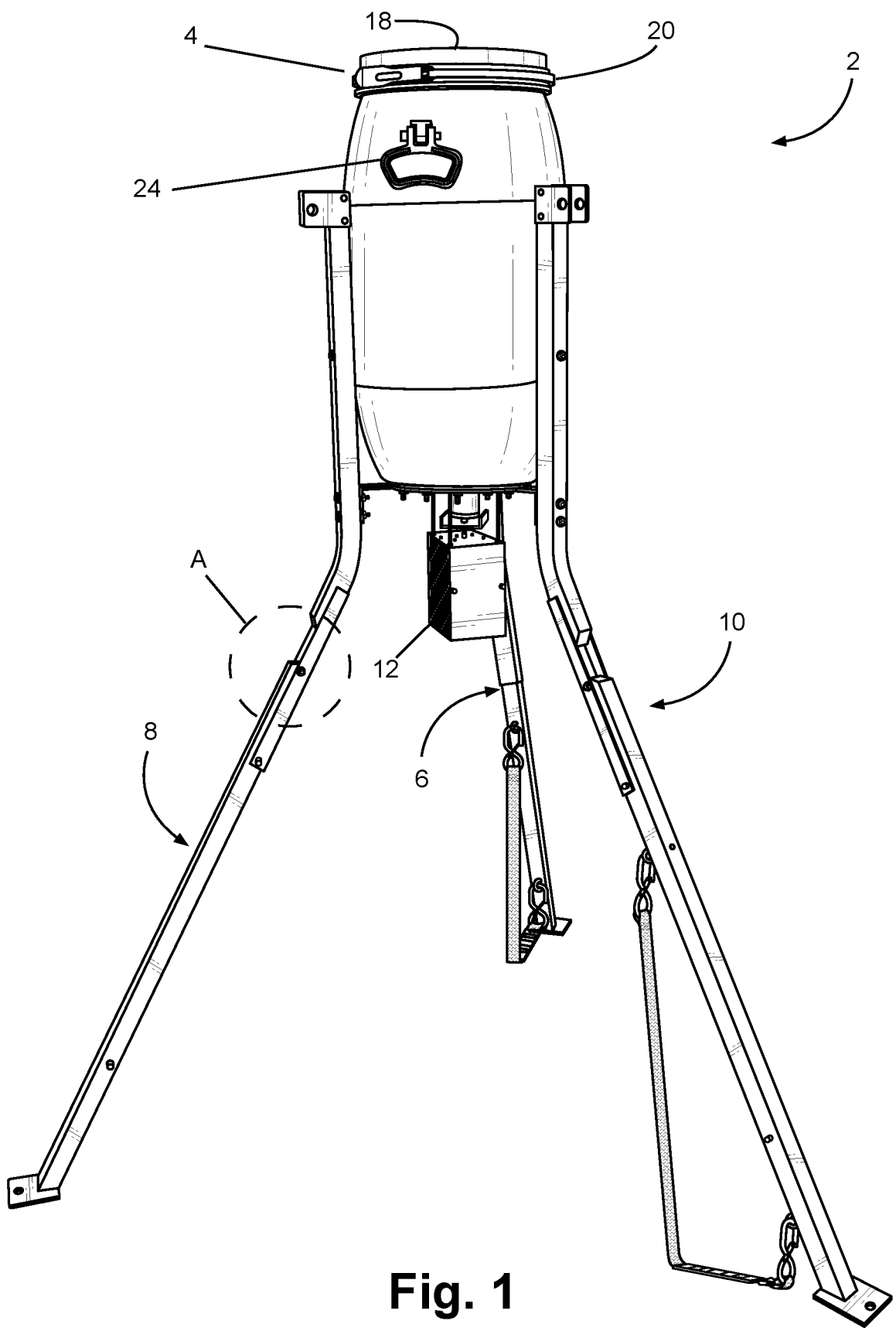
FIG. 1 is a right-front perspective view of a first exemplary embodiment of the apparatus configured in a deployed mode.
Figure 2:
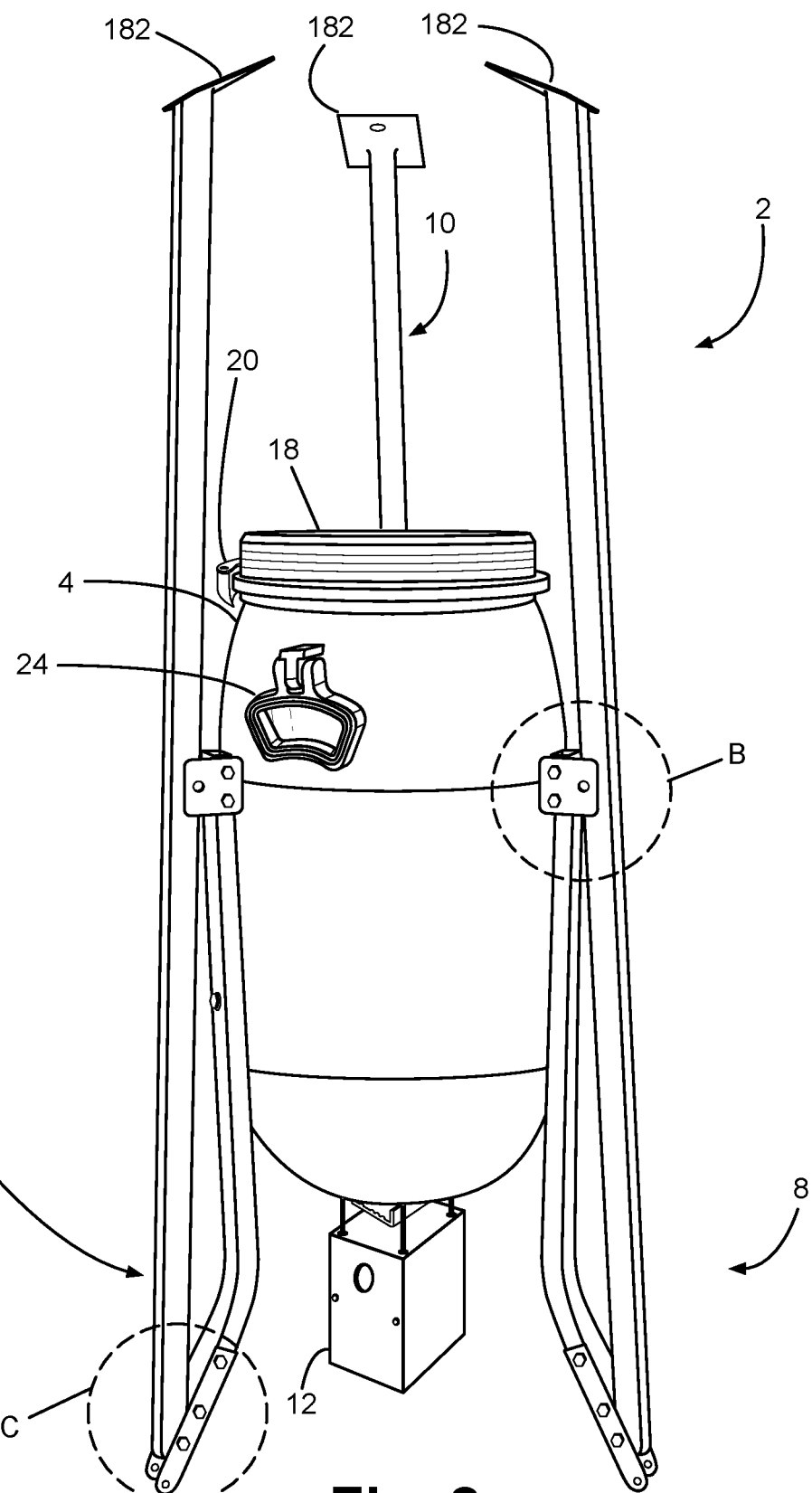
FIG. 2 is a front perspective view of the exemplary embodiment shown in connection with FIG. 1 as configured in a collapsed mode.
Figure 3:
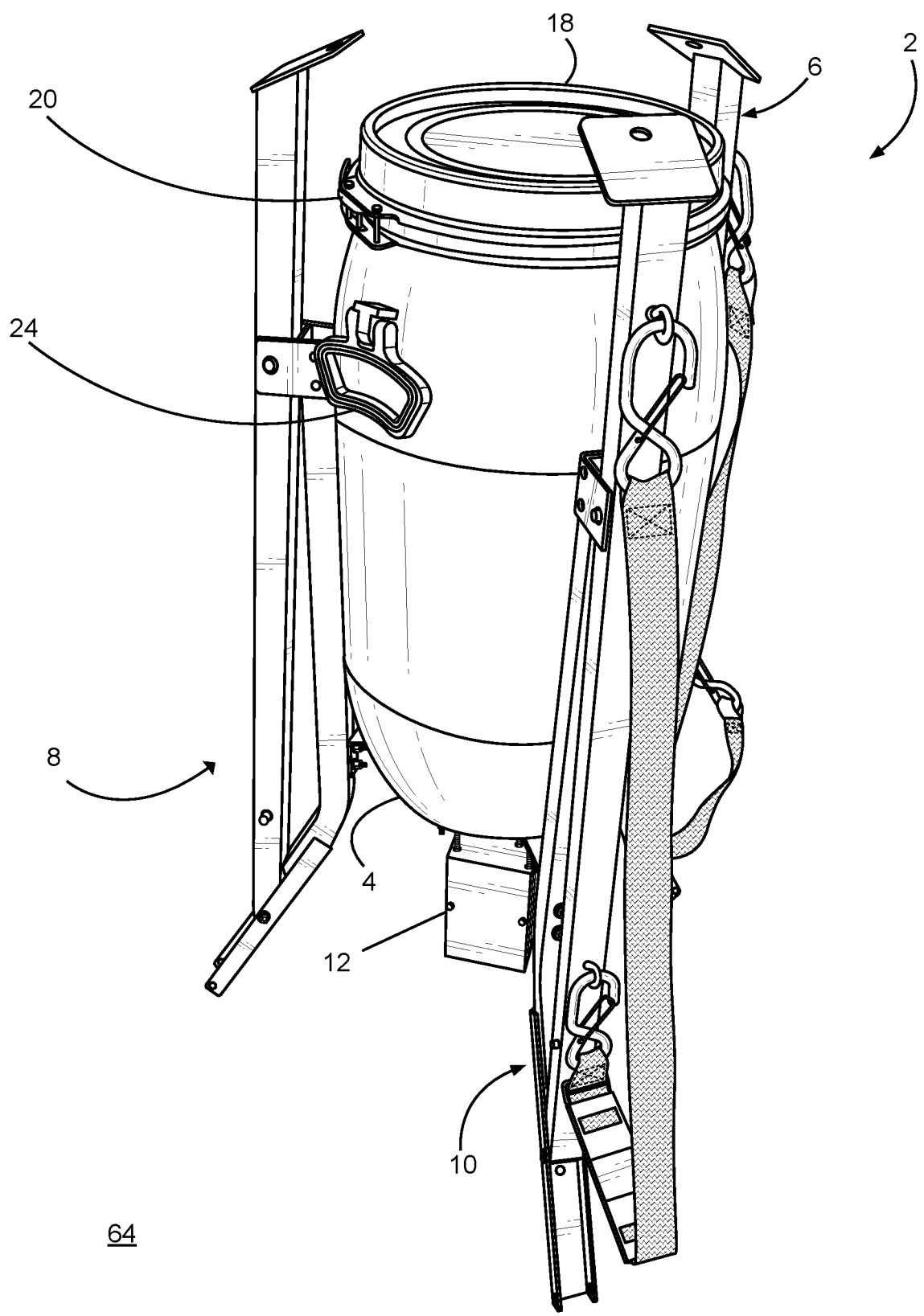
FIG. 3 is a right-rear perspective view of the exemplary embodiment configured as shown in FIG. 2.

Exemplary embodiments of the present invention are directed to a collapsible game feeder apparatus as shown in connection with FIGS. 1-3. In FIG. 1, a right-front perspective view of a first exemplary apparatus 2 is depicted wherein the apparatus is configured in a free-standing, deployed mode. A front perspective view of the exemplary embodiment shown in connection with FIG. 1 is shown in FIG. 2, wherein the apparatus 2 is configured in a folded, transport or storage, mode. FIG. 3 is a right-rear perspective view of the apparatus 2 as configured in FIG. 2.

The game feeder 2 generally includes a feed cavity 4, at least three legs 6, 8 and 10 which are configurable between two modes, and a feed distributor 12. An exemplary embodiment configured in the first of the two modes is shown in connection with FIG. 1, and may be referred to as a free-standing, extended, deployed, open or active mode. The exemplary embodiment shown in connection with FIG. 1 is shown configured in the second of the two modes in connection with FIGS. 2 and 3, which may be referred to as a folded, transport, collapsed, storage or inactive mode. The invention as described herein provides several unique advantages over known game feeder devices as a result of this modal design. For example, the ability to collapse into a smaller overall volume provides a user with easier, compact transport and shipping options, and permits the device to be used as both a free-standing and hanging-type game feeder. Furthermore, as will be evident by the further disclosure herein, the manner in which this mode is configured means that the game distributor element of the device is protected from damage by the design itself. This feature produces significant gains over known designs in terms of the invention's reliability, expected product life, transportability and general ease of use.

Figure 4:
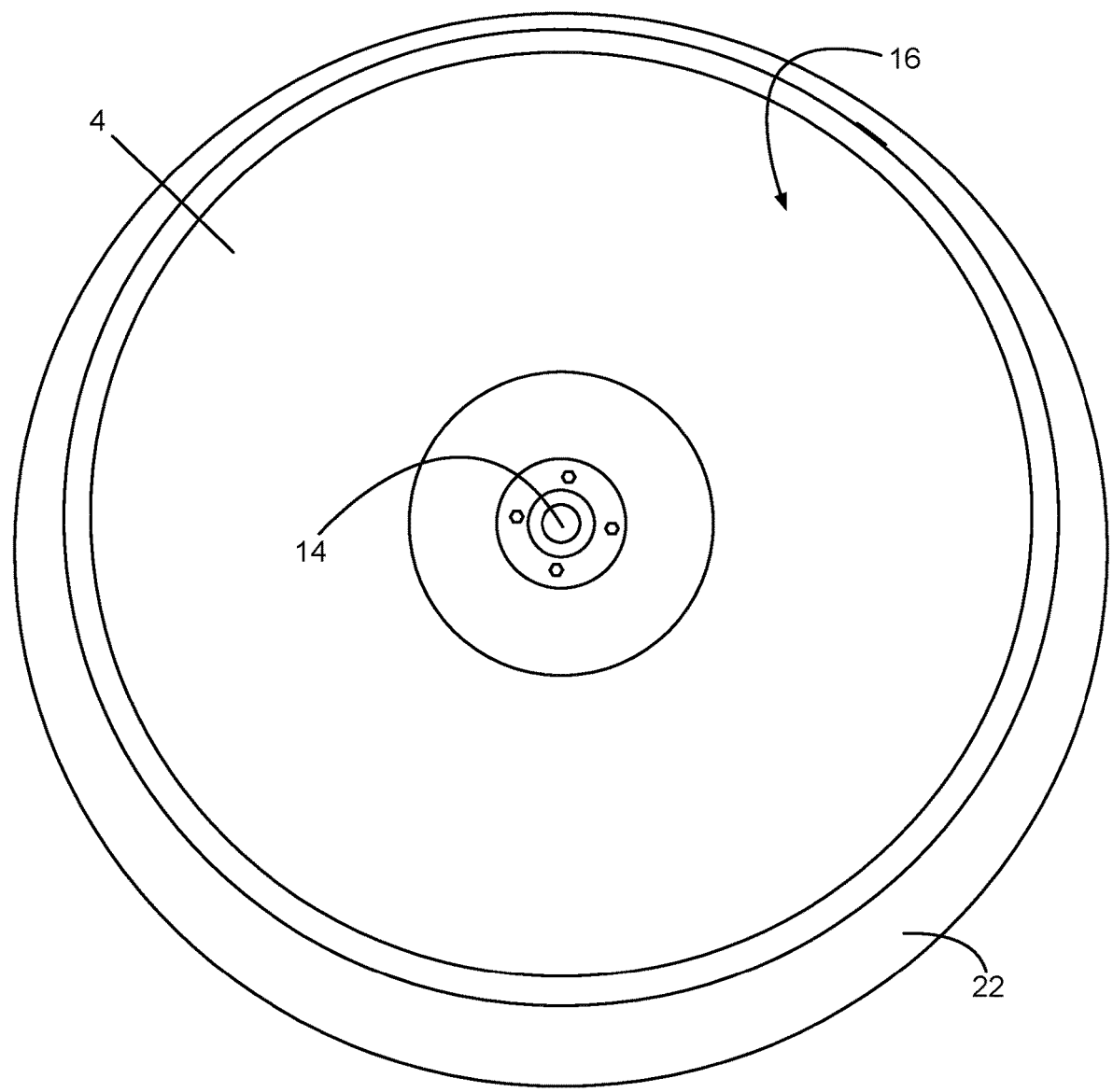
FIG. 4 is a top plan view of an exemplary feed cavity element of the apparatus.

A top-down interior view of the feed cavity 4 is shown in connection with FIG. 4 (i.e., the optional lid has been removed in this illustration). The feed cavity 4 is generally provided as an enclosed space that has at least one aperture 14. An aperture is provided as an egress point through which feed stored in the cavity 4 may pass to be distributed by the feed distributor 12. In a preferred embodiment, a second aperture 16 is provide through which feed may be added to the cavity 14 for ease of operation, but it will be readily understood by those in the art that the egress aperture 14 may be utilized for both filling and distributing feed. In the embodiment shown in connection with FIGS. 1-4, the feed cavity 4 is embodied as a plastic drum having a feed egress aperture 14, a feed ingress aperture 16 and a lid 18. The use of an ingress aperture 16 positioned opposite the egress aperture 14 is considered preferable as it provides for advantageous filling or refilling of the feed cavity while the device remains in a generally upright position.

A preferred embodiment may also be provided with a lid 18 having an optional lid clamp 20 mechanism. In this embodiment, the lid 18 is press-fit over the top lip 22 of the drum 14 and an annular clamp 20 is secured about the seam between the two. Those skilled in the art will appreciate that other comparable methods of securing a lid to a drum may be used, with the object being to isolate the feed contained within the drum element from environmental elements that can damage the feed contents, such as rain, snow, unwanted game access and the like. Furthermore, one or more optional handles 24 may form part of the drum or may be fastened thereto, in order to assist in moving or transporting the device 2.

Figure 5:
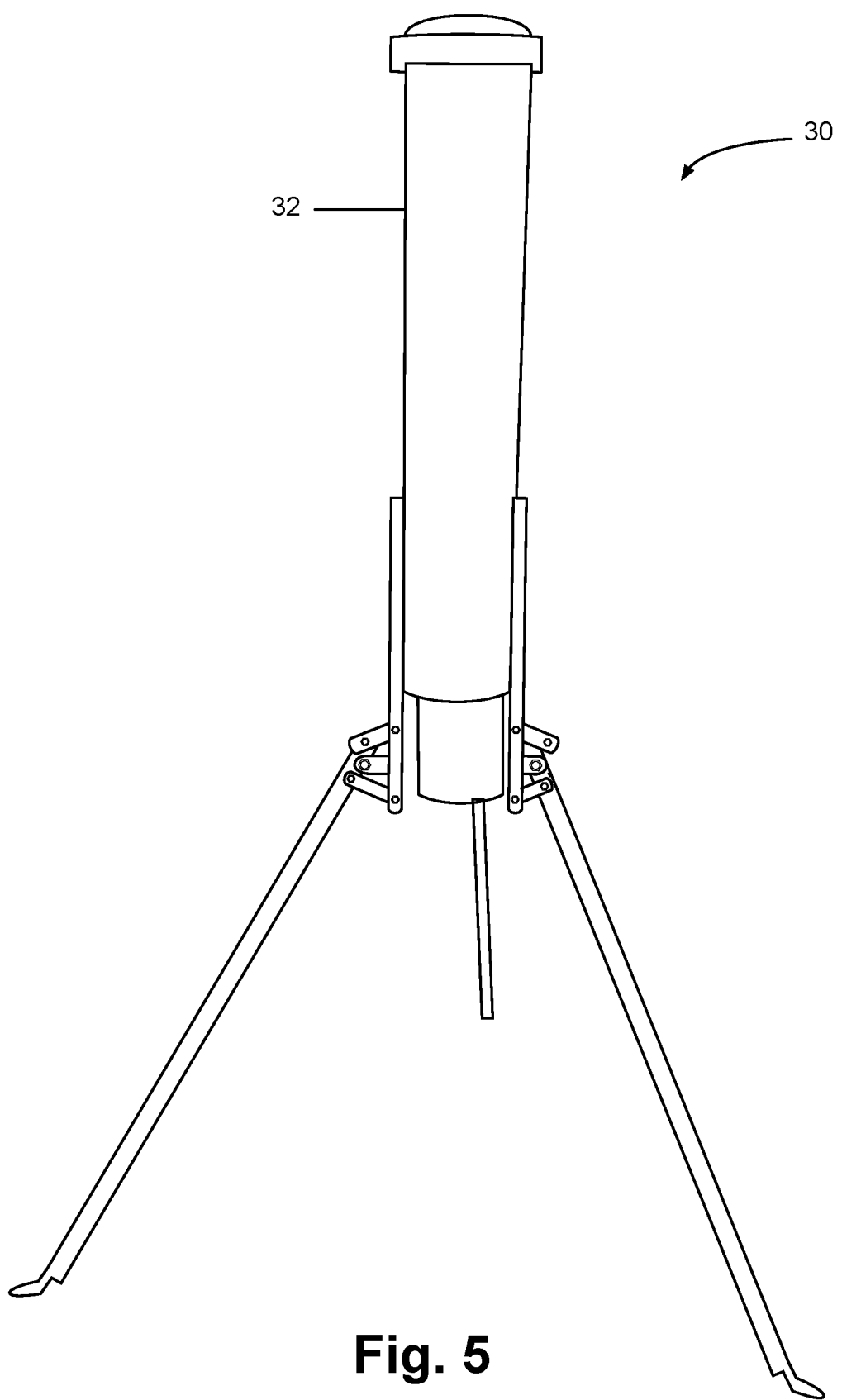
FIG. 5 is a perspective view of a second exemplary embodiment of the apparatus configured in a deployed mode.

In a preferred embodiment, the feed drum 14 is molded and has an approximate capacity of 80 pounds of feed material, and optionally may be constructed with a volume having an intended capacity of approximately 40-100 pounds. While preferred embodiments are shown herein, those skilled in the art will appreciate that the feed cavity may be configured in a variety of shapes, sizes, volumes and materials, and no description herein is intended to unreasonably limit the scope of the claims with respect to these variations. For example, a second exemplary embodiment of the invented game feeder apparatus 30, shown in connection with FIG. 5, depicts a feed drum 32 constructed in an elongate, cylindrical shape from fastened or welded sheet metal. The feed cavity may be provided generally, for instance, by molding, extrusion, welding, or other such comparable methods suitable for the intended purpose. In some embodiments, an optional sight gauge (not shown) may be provided as a means for readily checking the feed level in the drum.

Figure 6:
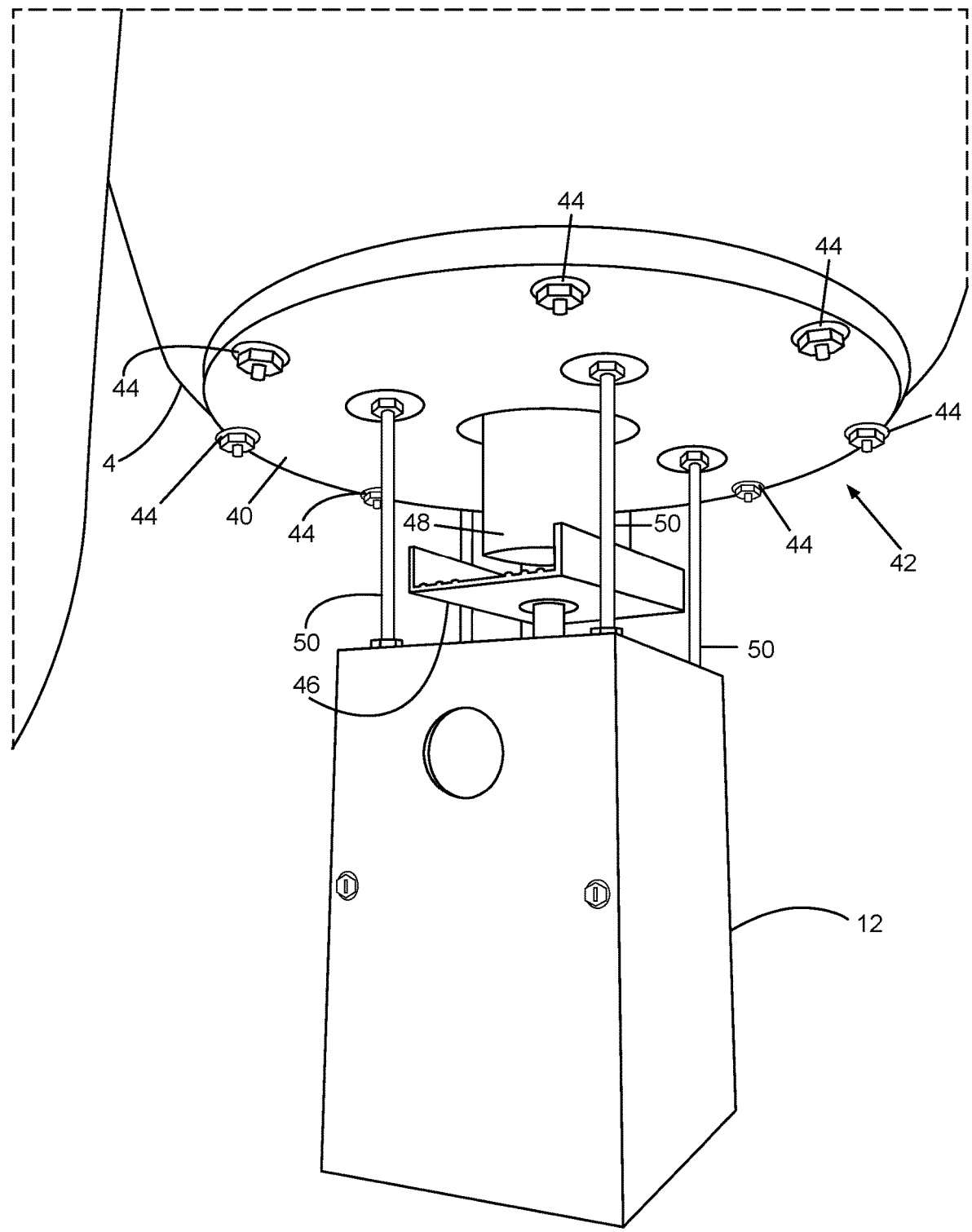
FIG. 6 is a zoomed, upward first view of the bottom of an exemplary drum element as shown in connection with the first exemplary embodiment of the apparatus.
Figure 7:
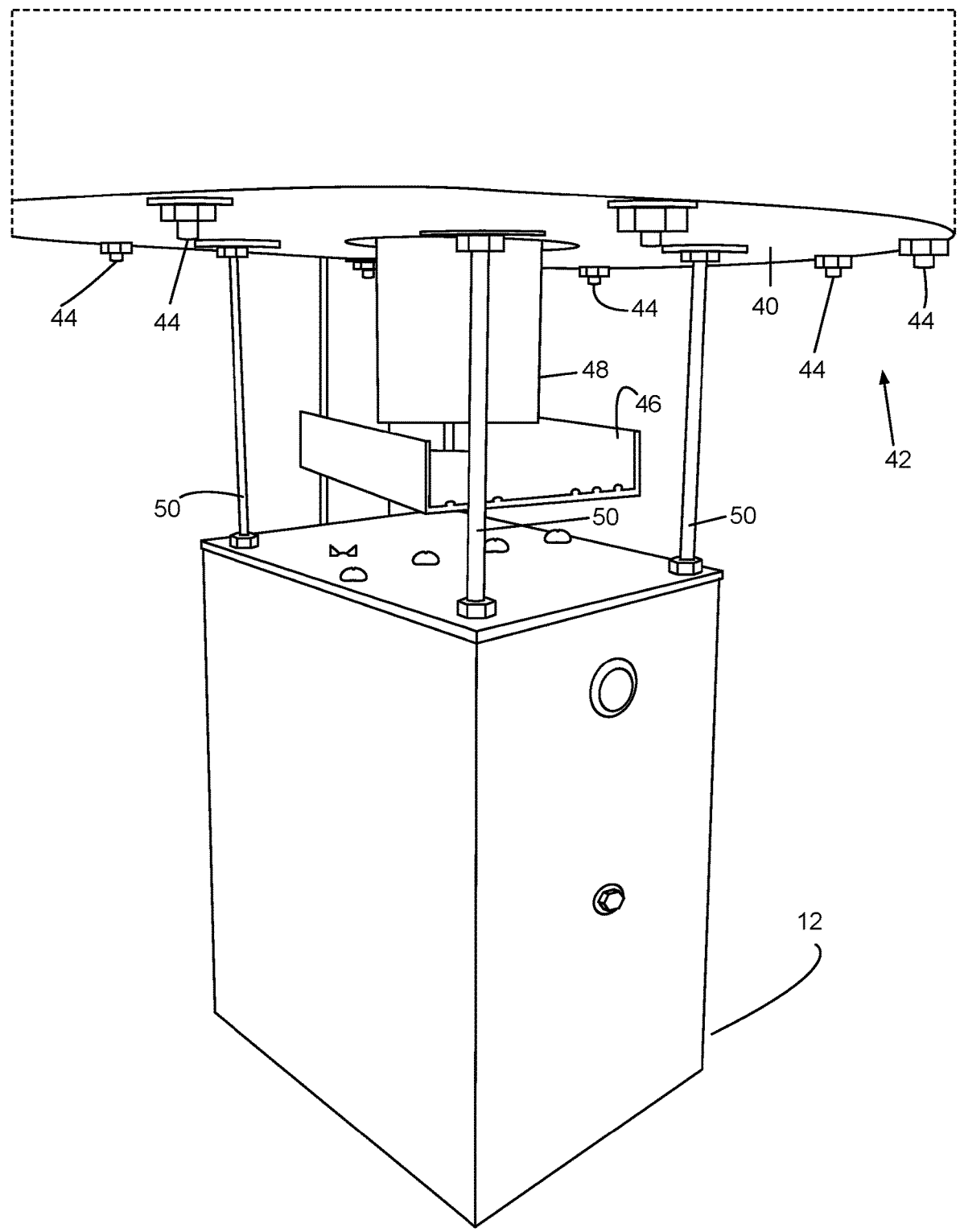
FIG. 7 is a zoomed, upward second view of the bottom of an exemplary drum element as shown in connection with the first exemplary embodiment of the apparatus.
Figure 8:
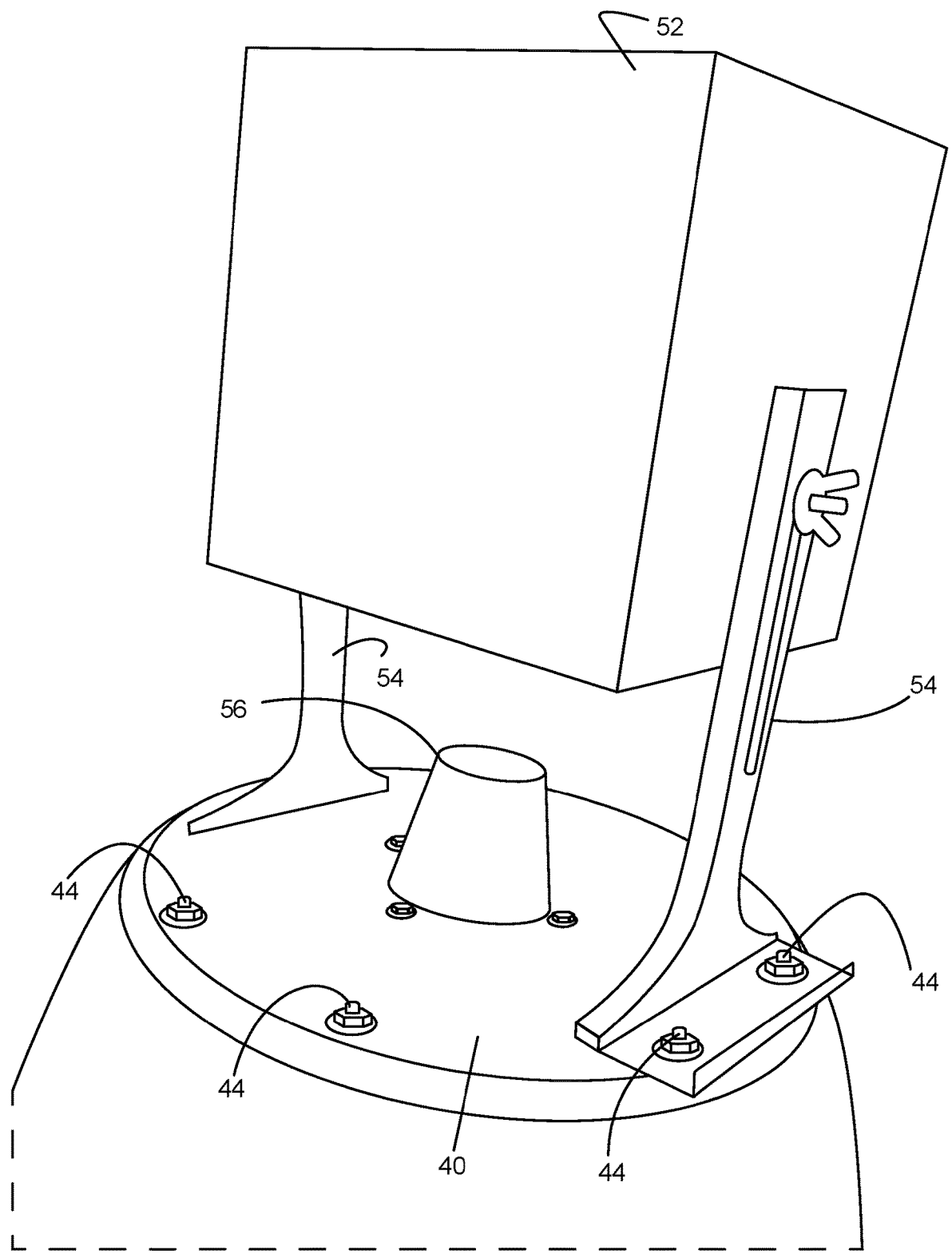
FIG. 8 is a perspective view of the bottom of a first optional alternative feed distributor configuration.

FIGS. 6 and 7 depict zoomed, upward views of the bottom of the exemplary drum 14 element as shown in connection with the first exemplary embodiment of the game feeder 2. Referring to FIGS. 6-8, a mounting plate 40 is shown secured at the egress aperture end 42 of the drum 14 using fasteners 44 such as an all thread, washer and nut combination as shown, bolts, rivets, welding, screws or other like methods. The purpose of the mounting plate 40 is to provide a resilient mounting element onto which a feed distributor 12 may be attached. In the exemplary embodiment shown, the feed distributor 12 is a flinging type distributor having a rotating plate 46 onto which the feed is deposited for distribution at predetermined intervals and quantities. The distributor 12 is mounted through the mounting plate 40 in connection with a distribution funnel 48 with bolts 50.

Figure 9:
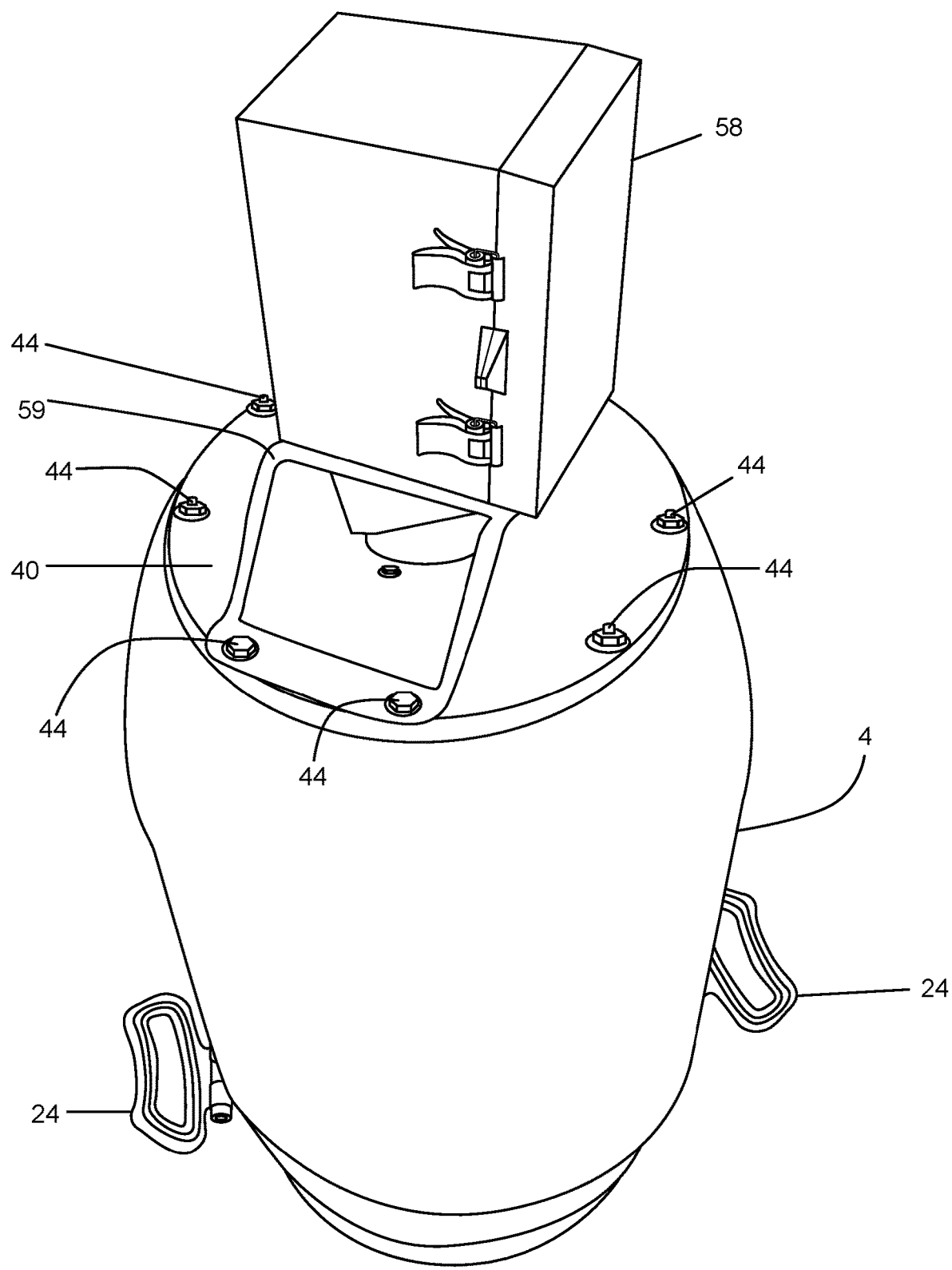
FIG. 9 is a perspective view of the bottom of a second optional alternative feed distributor configuration

FIGS. 8 and 9 illustrate optional alternative feed distributor configurations. Ultimately, the manner in which the distributors are best mounted with respect to the drums will somewhat depend upon the particular design of the feed distributor chosen for a given application, as those skilled in the art will appreciate. For example, FIG. 8 shows an alternative design for a feed distributor 52 in which the distributor is secured to the mounting plate 40 via lateral supports 54 using the mounting plate fasteners 44. A distribution funnel 56 is likewise secured to the center of the mounting plate 40. FIG. 9 shows yet another alternative feed distributor design 58 from feed distributors 12 and 52 secured in a similar manner to that of 52 with a different lateral support design 59 as well, via mounting plate fasteners 44. In this manner, the invented game feeder apparatus is versatile in that it may be easily configured to work with a variety of aftermarket or newly-design feed distributors.

Figure 10:
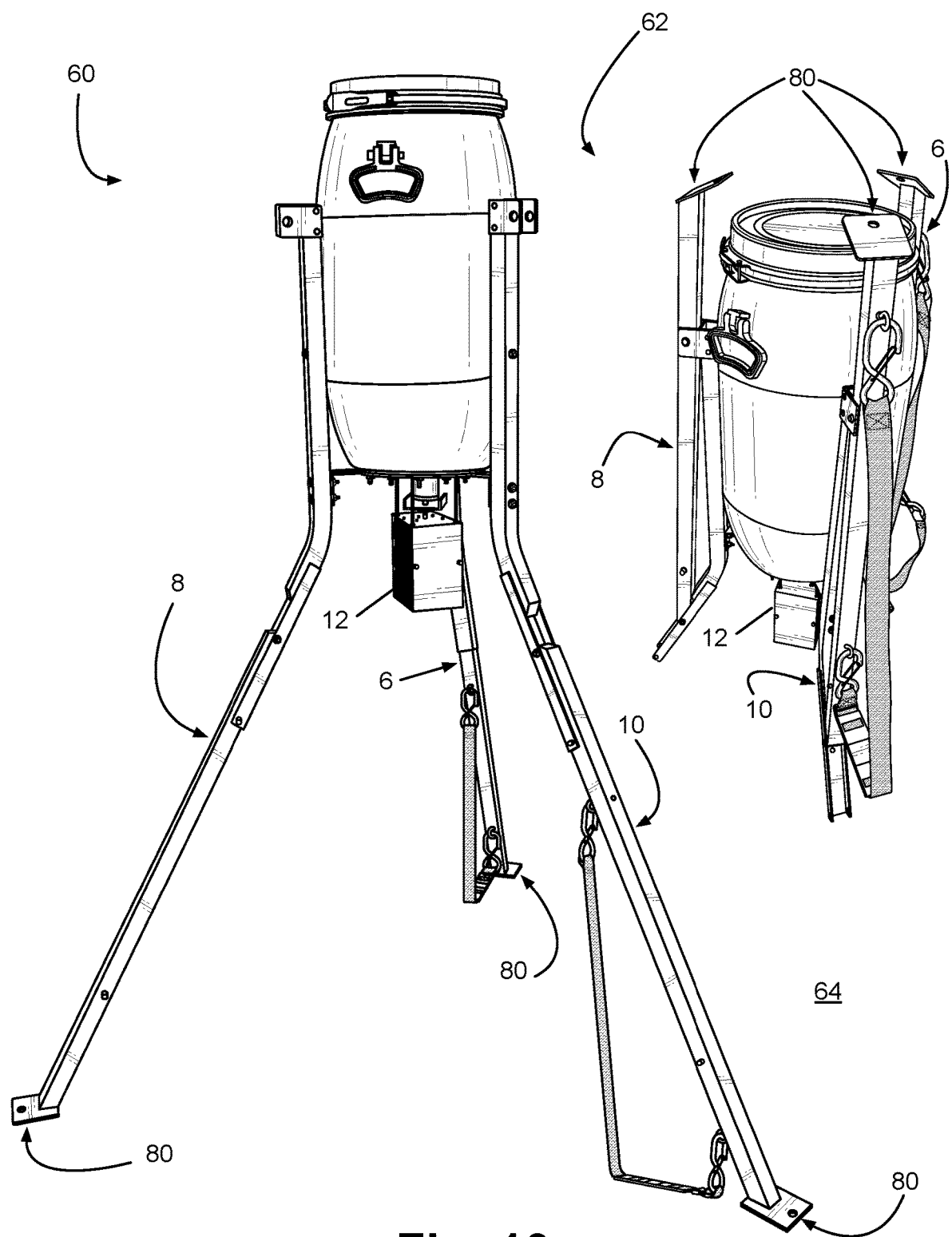
FIG. 10 is a perspective view of two devices of the first exemplary embodiment of the apparatus in deployed and collapsed configurations.

Another object of the invention is to provide a uniquely-collapsible game feeder in order to furnish the apparatus with several advantages. As described in further detail in connection with the exemplary embodiments illustrated herein, the manner of collapsibility reduces the overall footprint, or volume, of the apparatus when the legs are placed into storage mode, as depicted by the apparatus contrasted in deployed 60 and collapsed 62 modes in FIG. 10. This is advantageous not only because the apparatus can be stored more effectively when not in use, but also because the device may be shipped more readily (e.g., for less cost and within requiring assembly and disassembly), and is easily transported to selected remote feeding sites by a single user. Furthermore, the apparatus configuration is such that it provides exemplary protection to the feed distributor when in the collapsed mode, wherein the legs continue to support the overall apparatus on the ground while suspending the feed distributor above (note that the feed distributor 12 is not touching the floor surface 64 in the collapsed mode 62 as shown in FIGS. 2-3 and 10).

Figure 11:
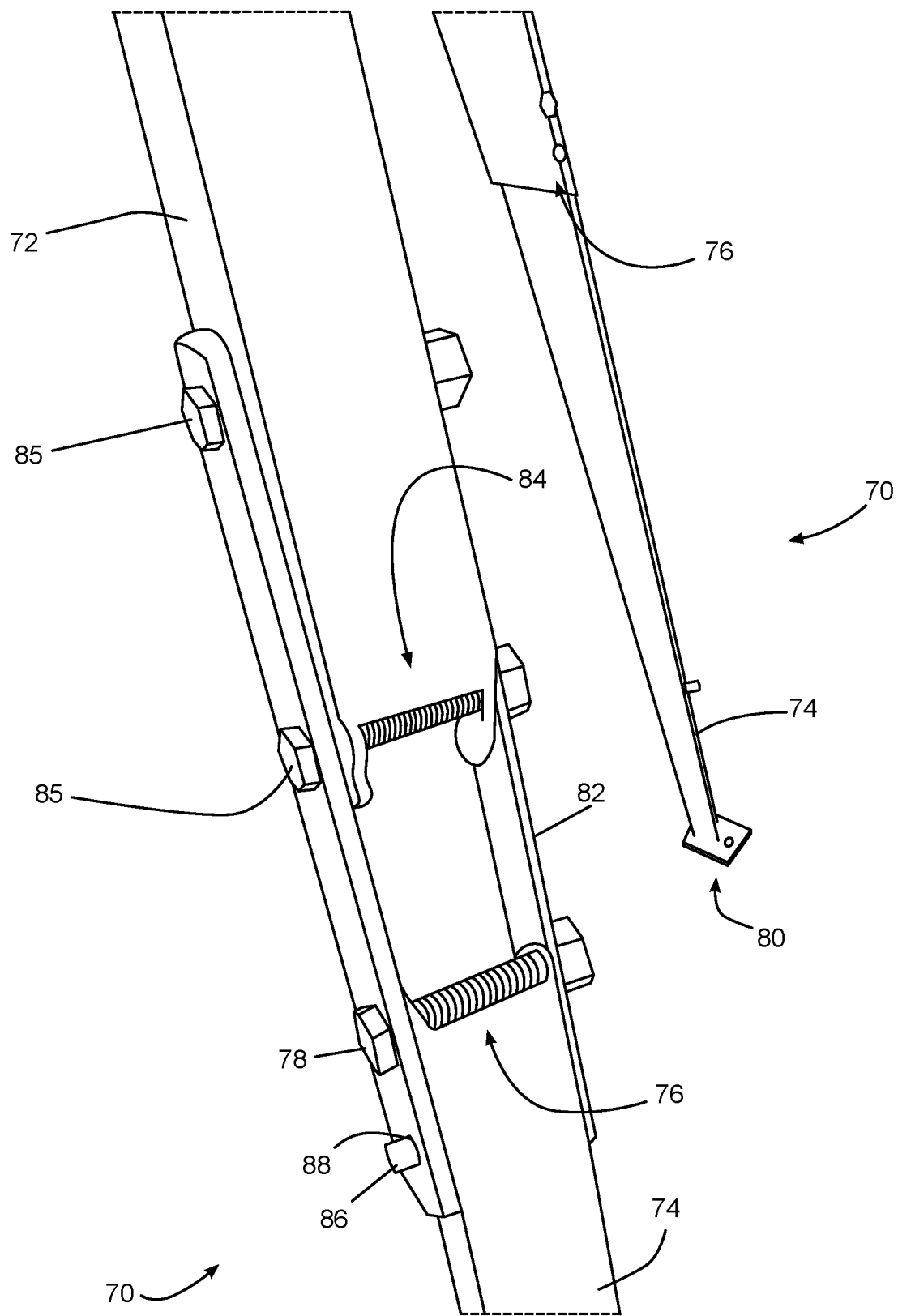
FIG. 11 is a perspective detail view of two exemplary collapsible legs in connection with the first exemplary embodiment.

In general, the three or more collapsible legs 70 (e.g., legs 6, 8 and 10 of the first exemplary embodiment shown in FIGS. 1-3 and 10) of the apparatus each comprise a fixed member 72 and a collapsible member 74. An instance of these collapsible legs 70 is depicted in FIGS. 11-15, wherein particular details of the first exemplary embodiment are shown. In FIG. 11, a perspective detail view of two exemplary collapsible legs 70 are shown. The collapsible member 74 rotates at a proximal end 76 about a pivot point 78 wherein the distal end 80 of the collapsible member 74 may be rotated from being one of the lowest points on the apparatus to one of the highest points (e.g., see FIG. 10). The proximal end 76 of the collapsible member 74 may be fixed with respect to the proximal end 84 of the fixed member 72 at the pivot point 78 via a pivot bracket 82, as shown in connection with the first exemplary embodiment, or it may be connected directly to the fixed member 72 (not shown). In the exemplary embodiment shown, a pivot bracket 82 containing the pivot point 78 is secured to the proximal end 84 of the fixed member 72 via two or more bolts 85. Other comparable methods of affixing the optional pivot bracket may be used without departing from the scope of the invention, such as rivets, welds, combinations thereof, and the like.

When in deployed mode, as depicted in connection with FIG. 11, the collapsible member 74 is secured into position by a means for locking the collapsible member into the deployed position. In some embodiments, the means is provided as a first outwardly-spring-biased thumb pin 86, which extends through an aperture 88 in the pivot bracket 82, thereby preventing rotational movement of the collapsible member 74. Those skilled in the art will appreciate that other comparable methods of temporarily fixing the collapsible member in the deployed position may be substituted for the thumb pin 86, such as but limited to quick release pins, cotter pins, a ratcheting/hinge lock mechanism, lynch pins and other such wire lock pins, positive locking pins, and the like. In a deployed mode 60 (as depicted in FIG. 11), the collapsible member 74 is positioned below the fixed member 72, thereby raising the overall height of the apparatus and by consequence the height from which the feed distributor 12 distributes feed.

Figure 12:
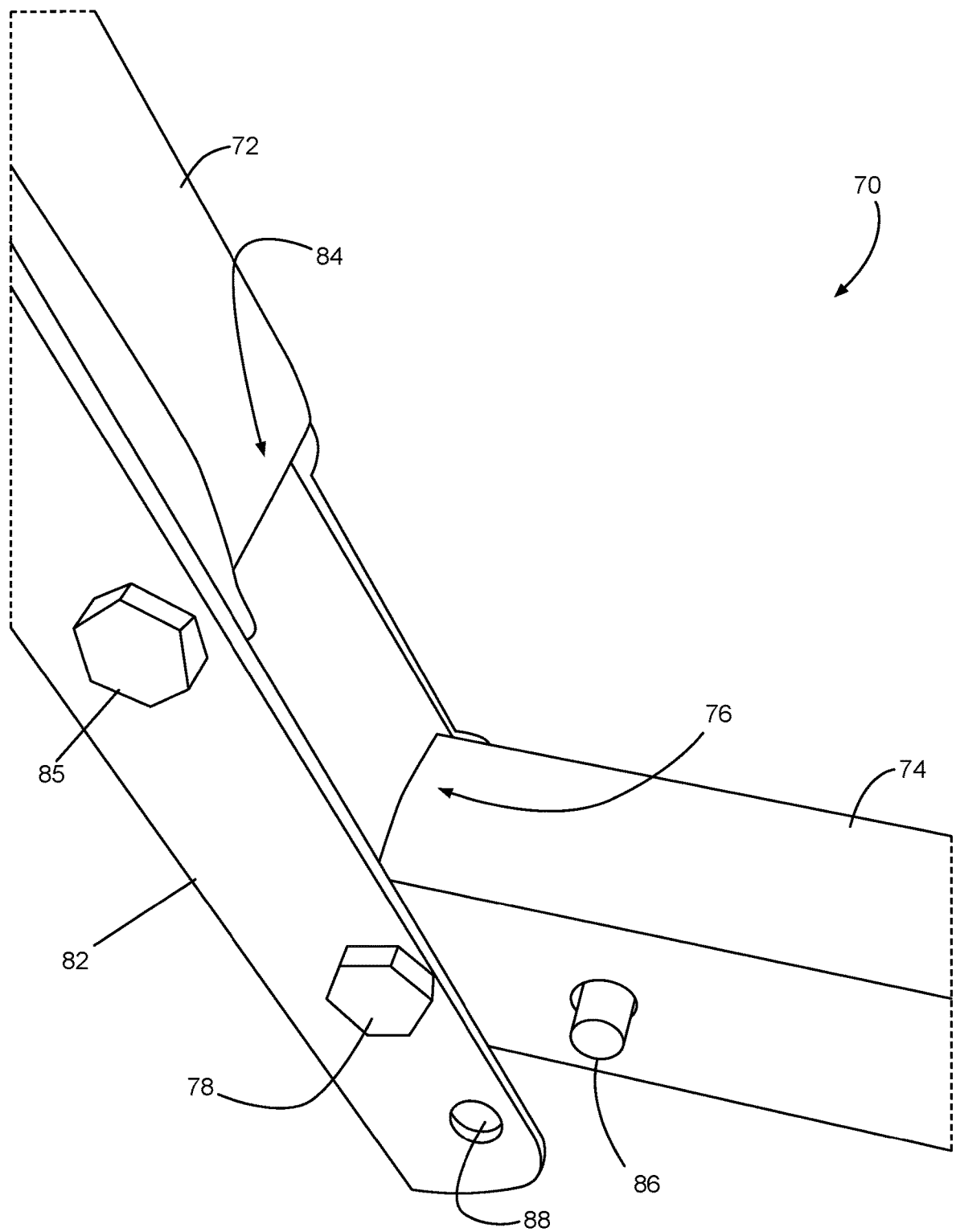
FIG. 12 is a perspective detail view of one exemplary collapsible leg as indicated at detail A of FIG. 1, wherein the collapsible member is positioned in between the deployed and collapsed modes.

In FIG. 12, a perspective detail view of one exemplary collapsible leg 70 is shown (as indicated in FIG. 1, detail A) wherein the collapsible member is positioned in between the deployed and collapsed modes. In this position, the thumb pin 86 has been depressed through the thumb pin aperture 88, thereby releasing the collapsible member 74 from the deployed mode position in which it was locked. In this figure, the collapsible member has been partially rotated about the pivot point 78. In some embodiments, an aperture and corresponding thumb pin may be provided on opposing sides of the proximal end of the collapsible member if desired, in order to provide additional stability when in the deployed mode.

Figure 13:
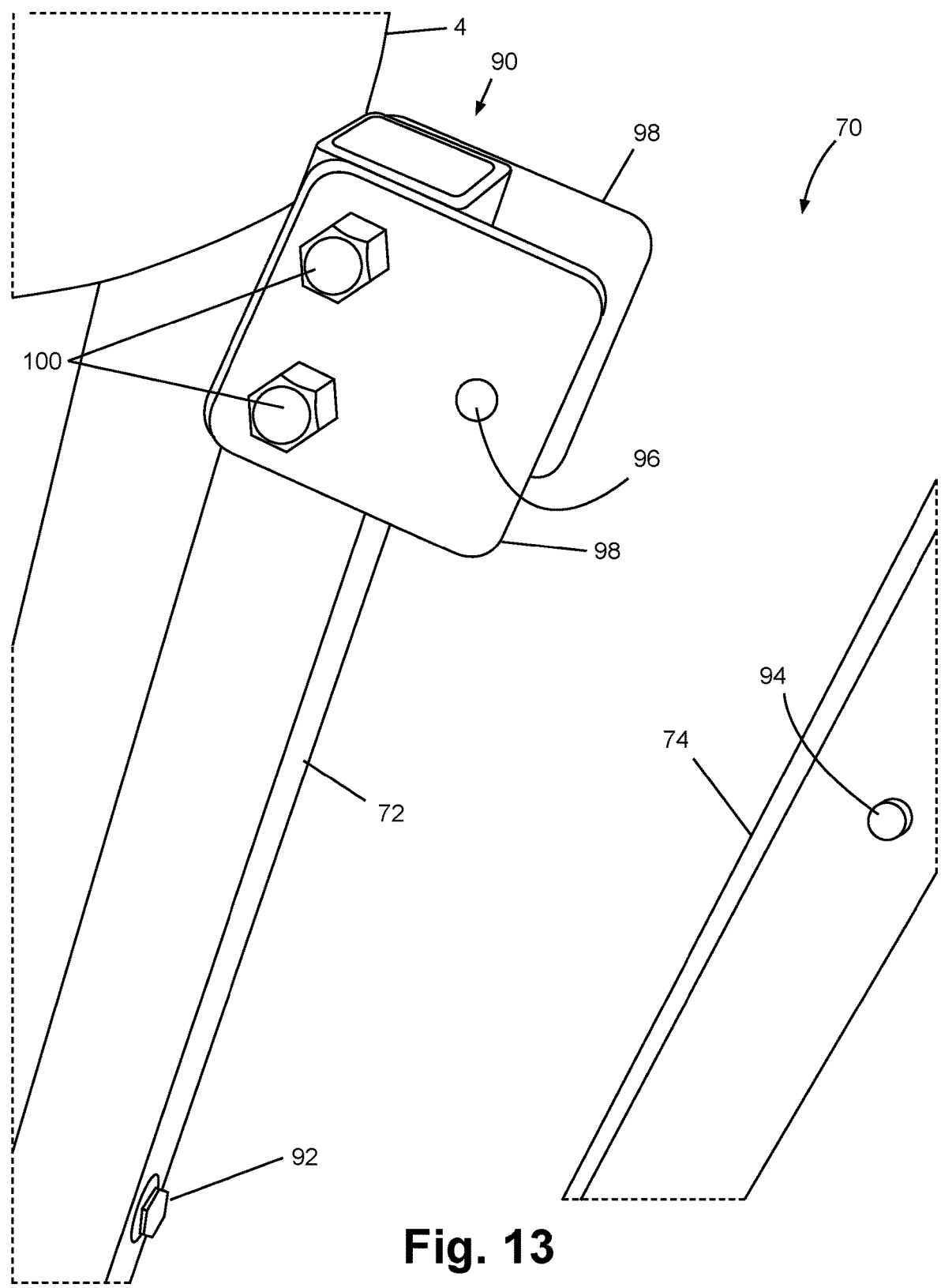
FIG. 13 is a perspective detail view of the proximal end of a fixed member of one of the exemplary collapsible legs wherein a collapsible member has been rotated upwards near the fully collapsed mode position.
Figure 14:
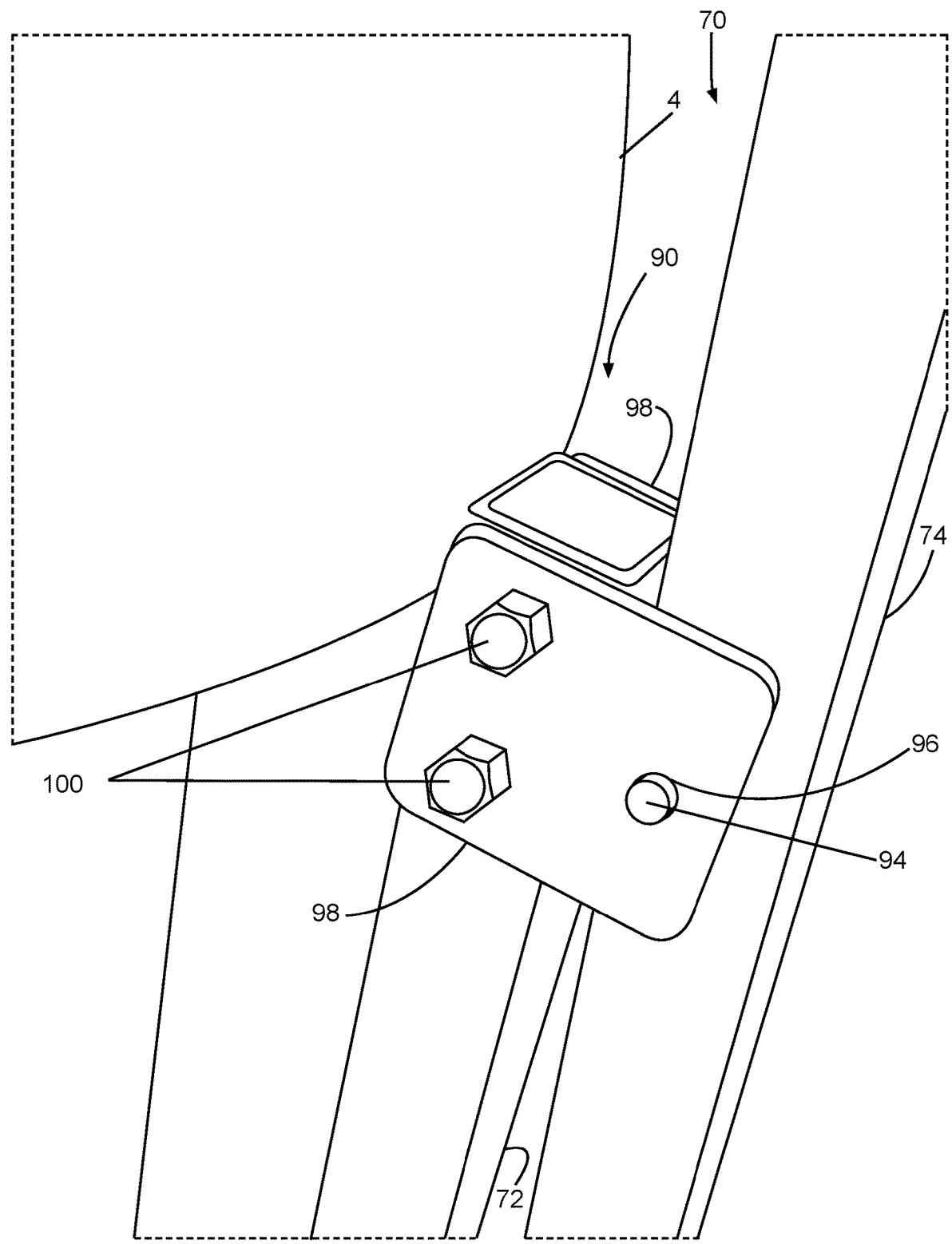
FIG. 14 is a perspective detail view of the proximal end of a fixed member of one of the exemplary collapsible legs as indicated at detail B of FIG. 2, wherein the collapsible member has been rotated fully into the collapsed position.

In FIG. 13, a perspective detail view of the distal end 90 of the fixed member 72 of one of the exemplary collapsible legs 70 is shown wherein the collapsible member 74 has been rotated upwards near the fully collapsed mode position. In FIG. 14, a perspective detail view of the distal end 90 of the fixed member 72 of one of the exemplary collapsible legs 70 is shown (as indicated in FIG. 2, detail B) wherein the collapsible member 74 has been rotated fully into the collapsed position. As in FIG. 12, FIG. 13 shows a further step of the collapsible member 74 being rotated upwardly toward its fully collapsed position (e.g., 62 in FIG. 10). The distal end (not shown in FIGS. 13-14, but visible as indicated at 80 in FIGS. 10-11) of the collapsible member 74 is rotated upwardly toward the distal end 90 of the fixed member 72. The fixed member 72 is generally secured to or formed as part of the housing defining the feed cavity 4. In the exemplary embodiment depicted here, the fixed member 72 is secured to the cavity housing via one or more bolts 92, while other comparable substitutions may be used, such as rivets, welds, screws, combinations thereof, and the like.

A means for locking the collapsible member 74 into the collapsed position is also provided, and in this exemplary embodiment comprises a second outwardly-spring-biased thumb pin 94 on the collapsible member 74 corresponding to a pin aperture 96 fixed with respect to the fixed member 72. The aperture 96 may be formed as part of the fixed member 72 itself (not shown), or may be provided set off from the fixed member 72 via one or more collapsed mode brackets 98, in turn secured to the fixed member 72 via bolts 100 or other comparable methods, such as flanges forming part of the fixed member, screws, rivets, welding, combinations thereof, and the like. Other means may include thumb toggles that rotate outside of the width of the fixed member in order to hold the collapsed member against the feed cavity and next to the fixed member when in collapsed mode.

Figure 15:
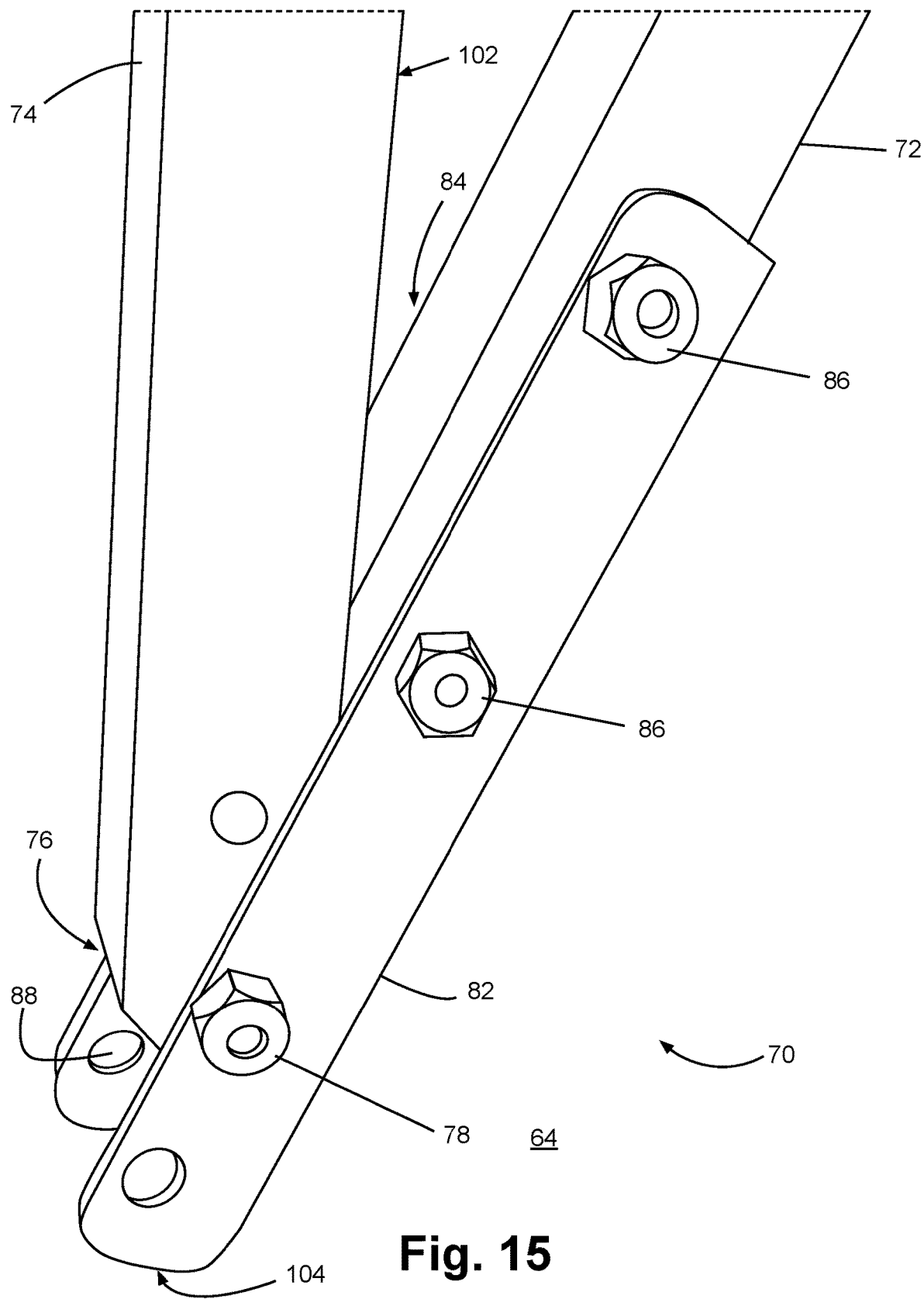
FIG. 15 is a perspective detail view of the distal end of a fixed member and the distal end of a collapsible member as indicated at detail C of FIG. 2, in the same apparatus configuration as that shown in FIG. 14.
Figure 16:
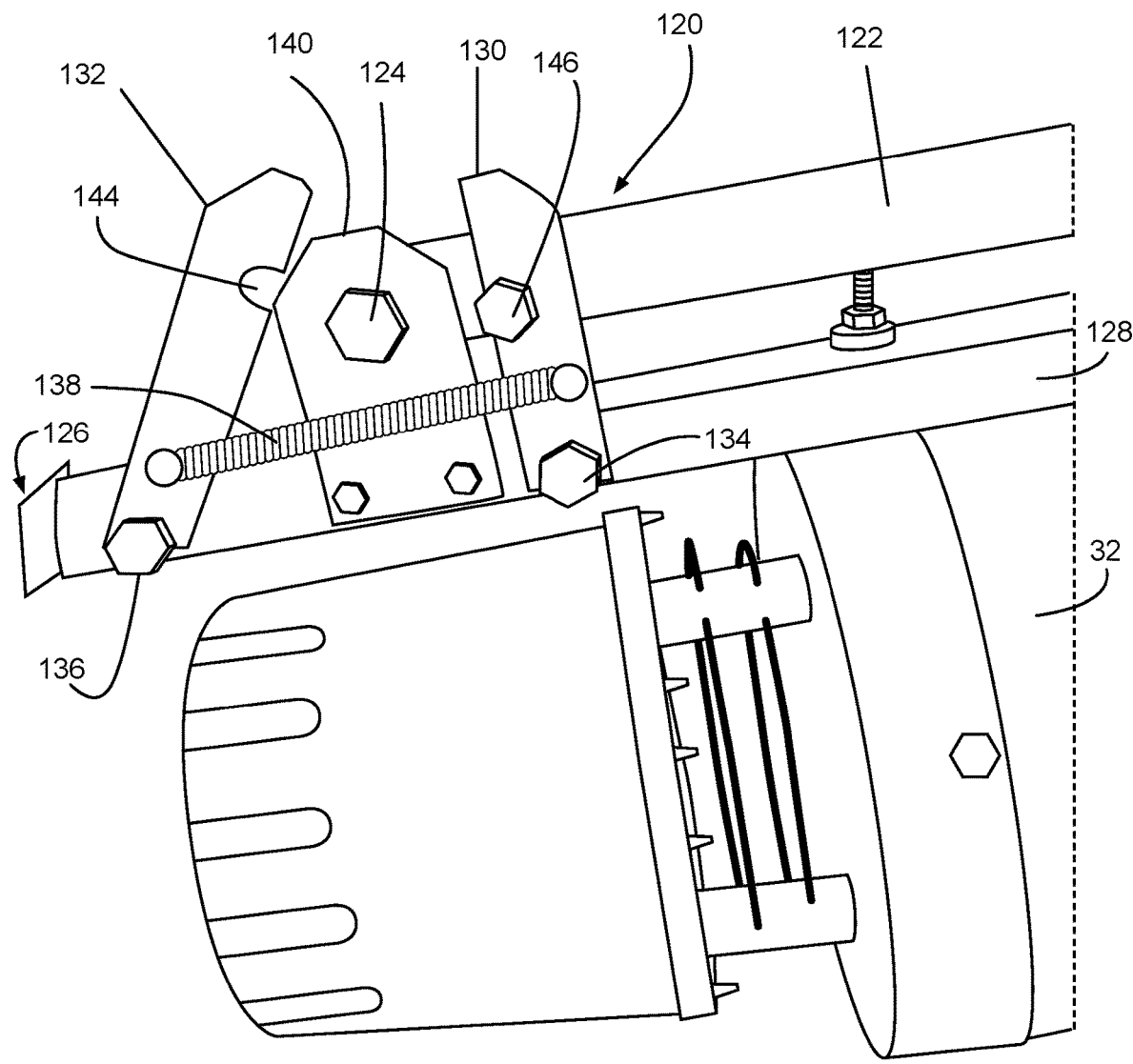
FIG. 16 is a perspective detail view of one exemplary collapsible leg of the second exemplary embodiment of the apparatus, wherein the collapsible member is positioned in the collapsed mode.

The proximal end 84 of the fixed member 72 and the proximal end 76 of the collapsible member 74 are shown in perspective detail view in FIG. 15 (as indicated in FIG. 2, detail C) in the same position as that shown in FIG. 14. Note that in this embodiment, the proximal end 84 of the fixed member 72 is angled such that the inner surface 102 of the collapsible member 74 rests against the end 84 at an angle appropriate for the collapsible member 74 to be locked into place via the means for locking the collapsible member 74 into the collapsed position as discussed above. Also of note is that the bottom 104 of the pivot bracket 82 rests upon the ground surface 64 when the apparatus is in the collapsed mode, as seen here in FIG. 15. This feature significantly provides protection to the feed distributor (not shown in FIG. 15) when in collapsed mode, prolonging the life and optimal operation of the feed distributor.

In some embodiments, the collapsible members of the legs will extend from 30-45 degrees from vertical when the apparatus is placed in the deployed mode. Preferably, the collapsible members of the legs will extend from the pivot point with the fixed member between three and eight feet, and are secured into the deployed mode with two or more thumb pins. In some embodiments, the leg components are formed from 1"-1.5" thick hollow square metal tubing, with variability primarily based upon the volumetric capacity of the feed cavity and the corresponding expected weight being supported by the legs.

Figure 17:
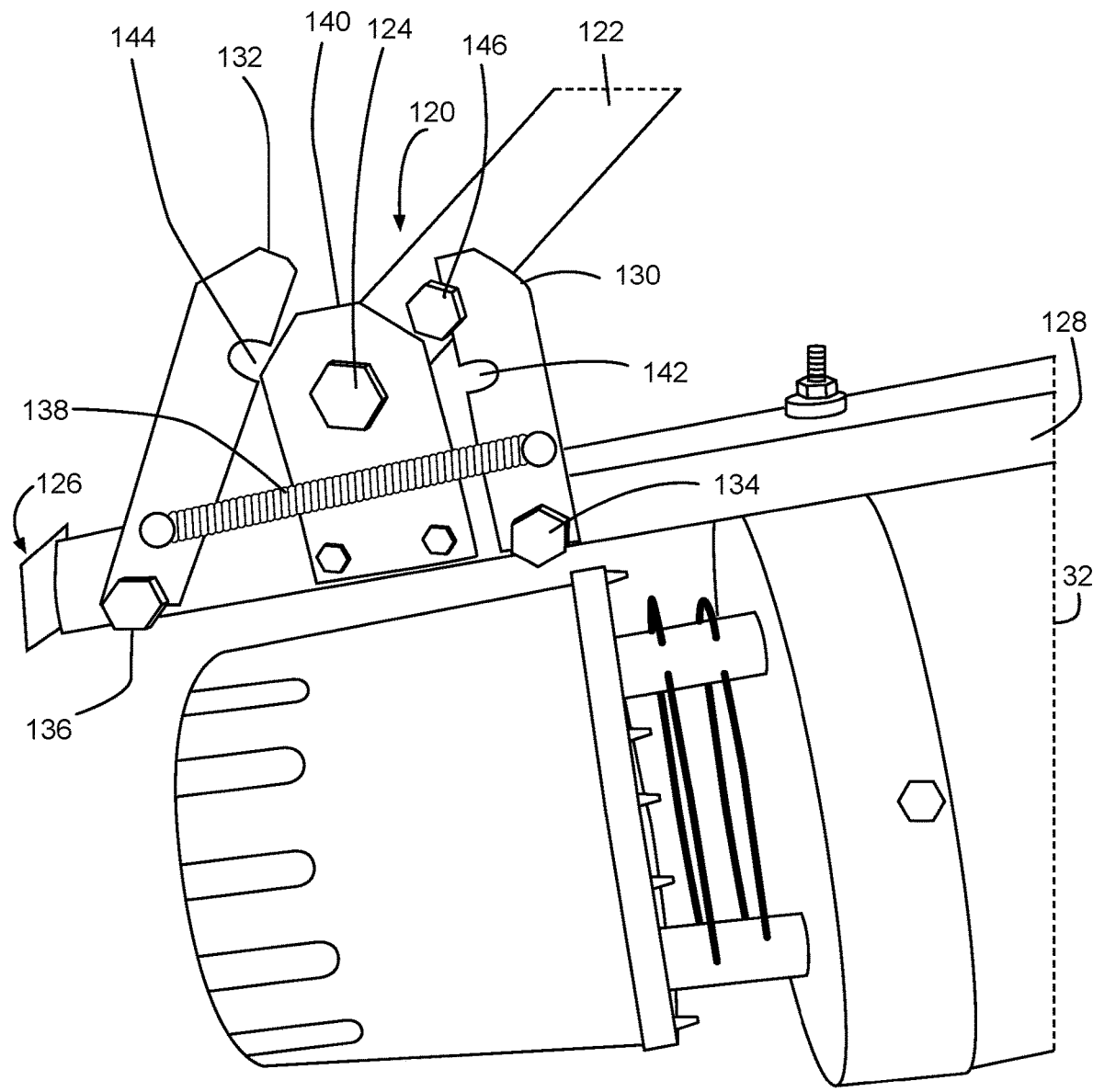
FIG. 17 is a further perspective detail view of FIG. 16, wherein the collapsible member is positioned between the deployed and collapsed modes.
Figure 18:
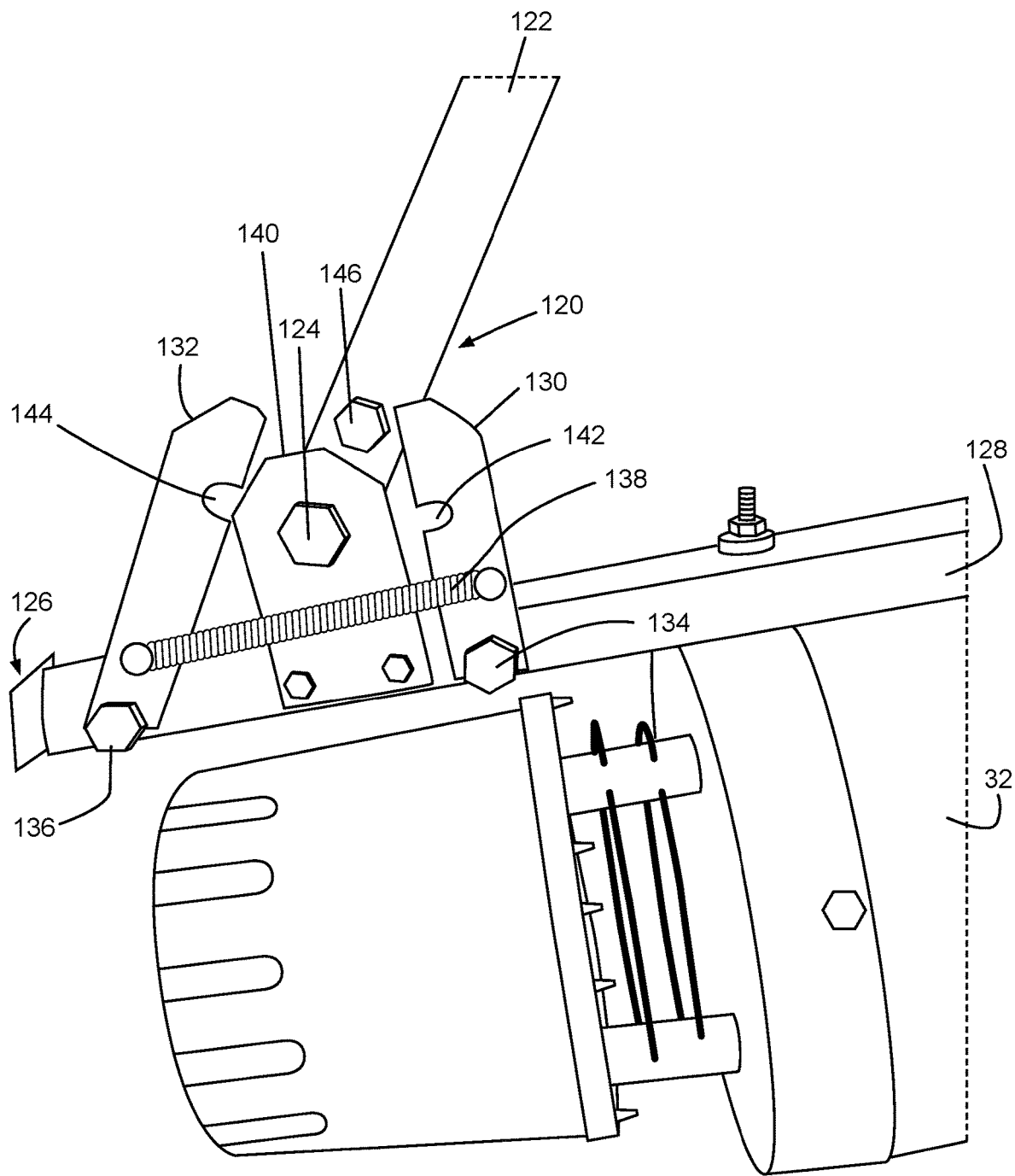
FIG. 18 is a further perspective detail view of FIG. 16, wherein the collapsible member is positioned between the deployed and collapsed modes.
Figure 19:
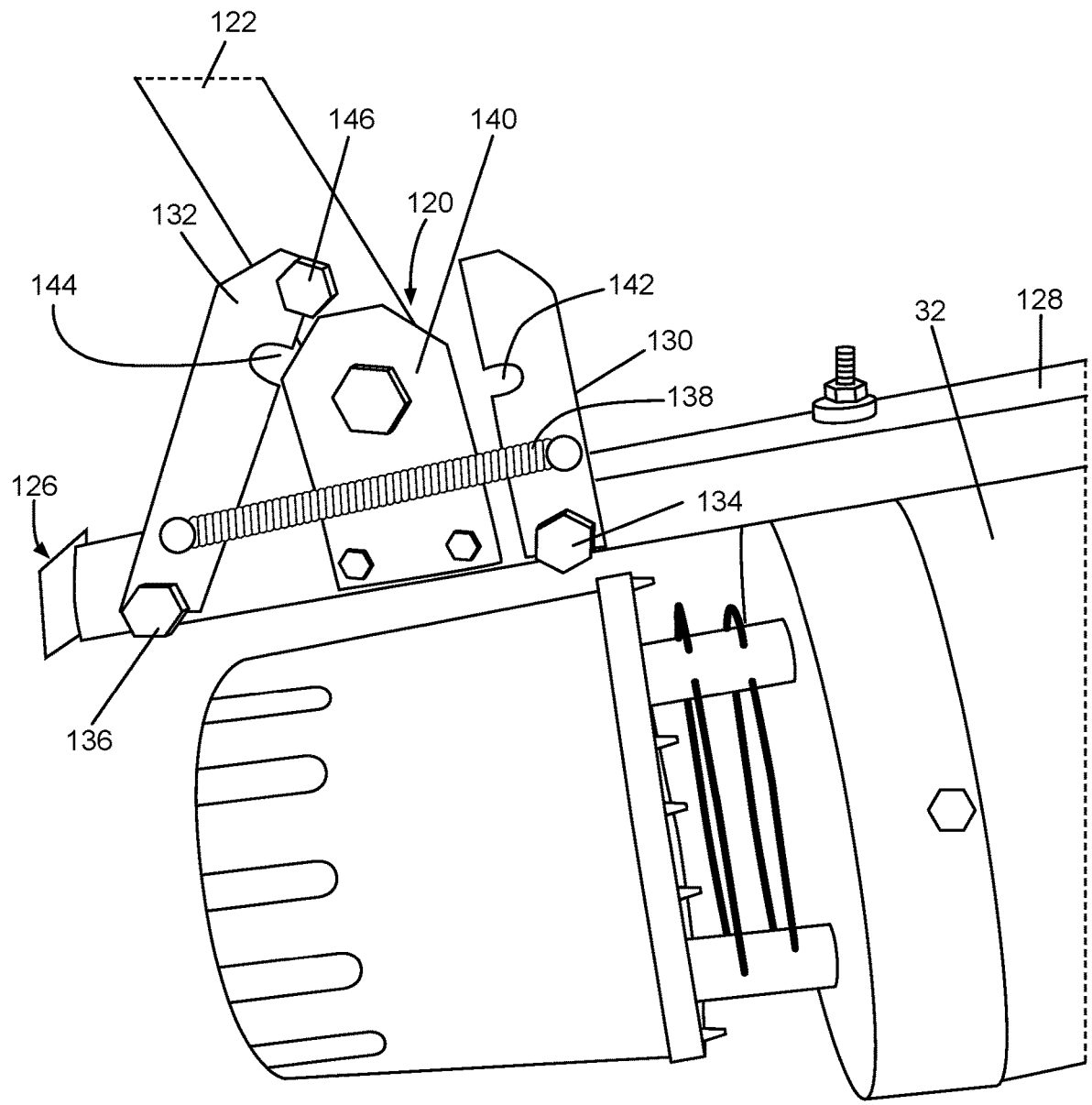
FIG. 19 is a further perspective detail view of FIG. 16, wherein the collapsible member is positioned between the deployed and collapsed modes.

Turning to FIGS. 16-20, a perspective detail view of the proximal ends of the fixed and collapsible members of the second exemplary embodiment of the apparatus are shown (see 30, FIG. 5). The pivot mechanism is depicted in the collapsed mode in connection with FIG. 16. Here, the proximal end 120 of the collapsible member 122 is shown rotably secured to a pivot point 124 with respect to the distal end 126 of the fixed member 128, which is fixed in turn with respect to the feed cavity 32. FIGS. 17-19 show, progressively, the collapsible member 122 being rotated about the pivot point 124 into the deployed position, which is depicted in connection with FIG. 20.

Figure 20:
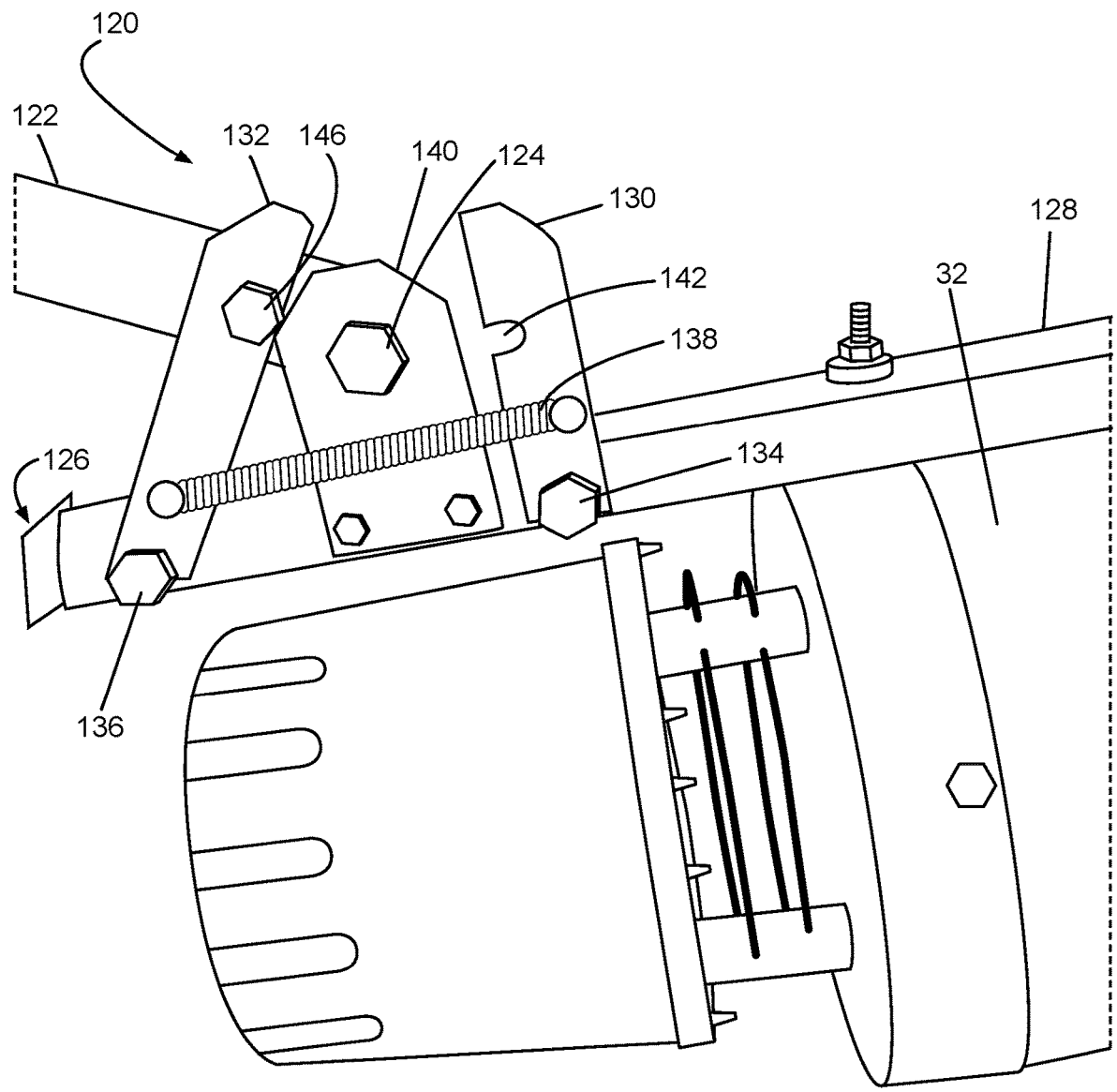
FIG. 20 is a further perspective detail view of FIG. 16, wherein the collapsible member is positioned in the deployed mode.

Referring generally to these FIGS. 16-20, the second exemplary embodiment exhibits an optional mode-locking pivot mechanism different from that described in connection with FIGS. 11-15. In this embodiment, the pivot mechanism is comprised of upper 130 and lower 132 locking flanges, each with a fixed end rotably secured to the fixed member 128 via pivot points 134 and 136, respectively. The locking flanges 130 and 132 are biased to rotate toward one another via spring 138. A pivot bracket 140 (or flange extending from the fixed member) is fixed with respect to the fixed member 128 and provides the pivot attachment 124 by which the collapsible member 122 is secured and about which it pivots to transition between the two modes. Each of the upper 130 and lower 132 locking flanges have a locking notch, 142 and 144 respectively, located to receive a locking pin 146 fixed to the collapsible member 128. As seen by the progression shown in FIGS. 16-20, the upper locking flange 130 is lifted away from the pivot point 124 to release the locking pin 146, thereby allowing the collapsible member to freely rotate about the pivot point 124. As seen in FIG. 19, the movement of the collapsible member 122 eventually pushes the lower locking flange 132 away from the pivot point, until—as seen in FIG. 20, the locking pin 146 is received into the locking notch 144 of the lower flange 132, thereby securing the collapsible member 122 into the deployed position. Those skilled in the art will appreciate that other comparable methods of locking the collapsible legs into the deployed and collapsed modes may be substituted without departing significantly from the scope of the invention.

Figure 21:
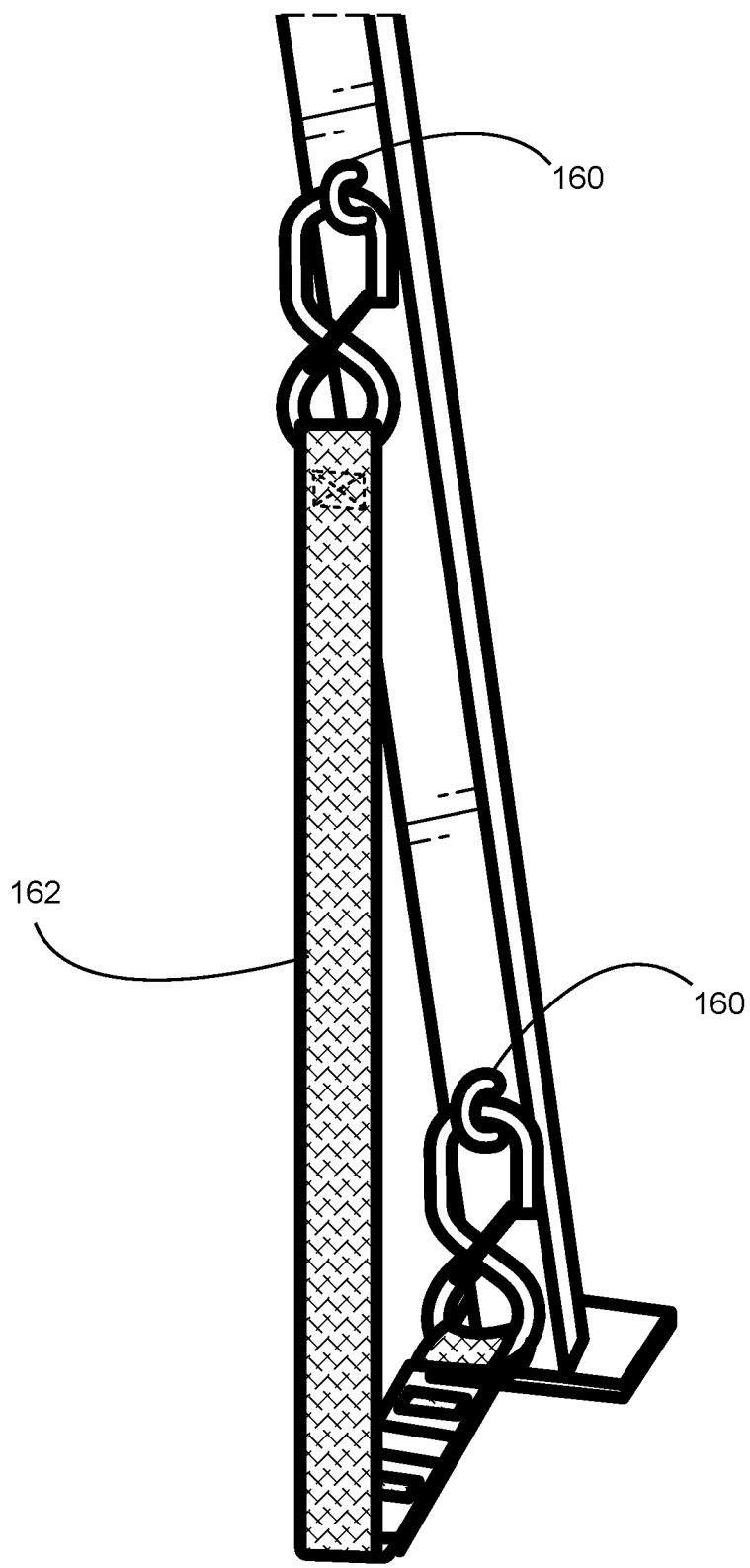
FIG. 21 is a perspective detail view of a collapsible member of the first exemplary embodiment.

Turning to FIG. 21, another exemplary optional feature of the invented apparatus is shown. In some embodiments, one or more of the legs are provided with shoulder strap attachment points 160, wherein a shoulder strap 162 is generally provided. In some embodiments, one shoulder strap is provided for use in a manner similar to those used in golf equipment bags, and in other embodiments two straps are provided for use in a manner similar to a backpack-style. In both of these optional configurations, combined with the general orientation of the apparatus in collapsed mode, the ease of transport is greatly increased over prior art devices. This is particularly advantageous in that the apparatus may be transported to a remote selected feeding site by a single person easily and comfortably.

Figure 22:
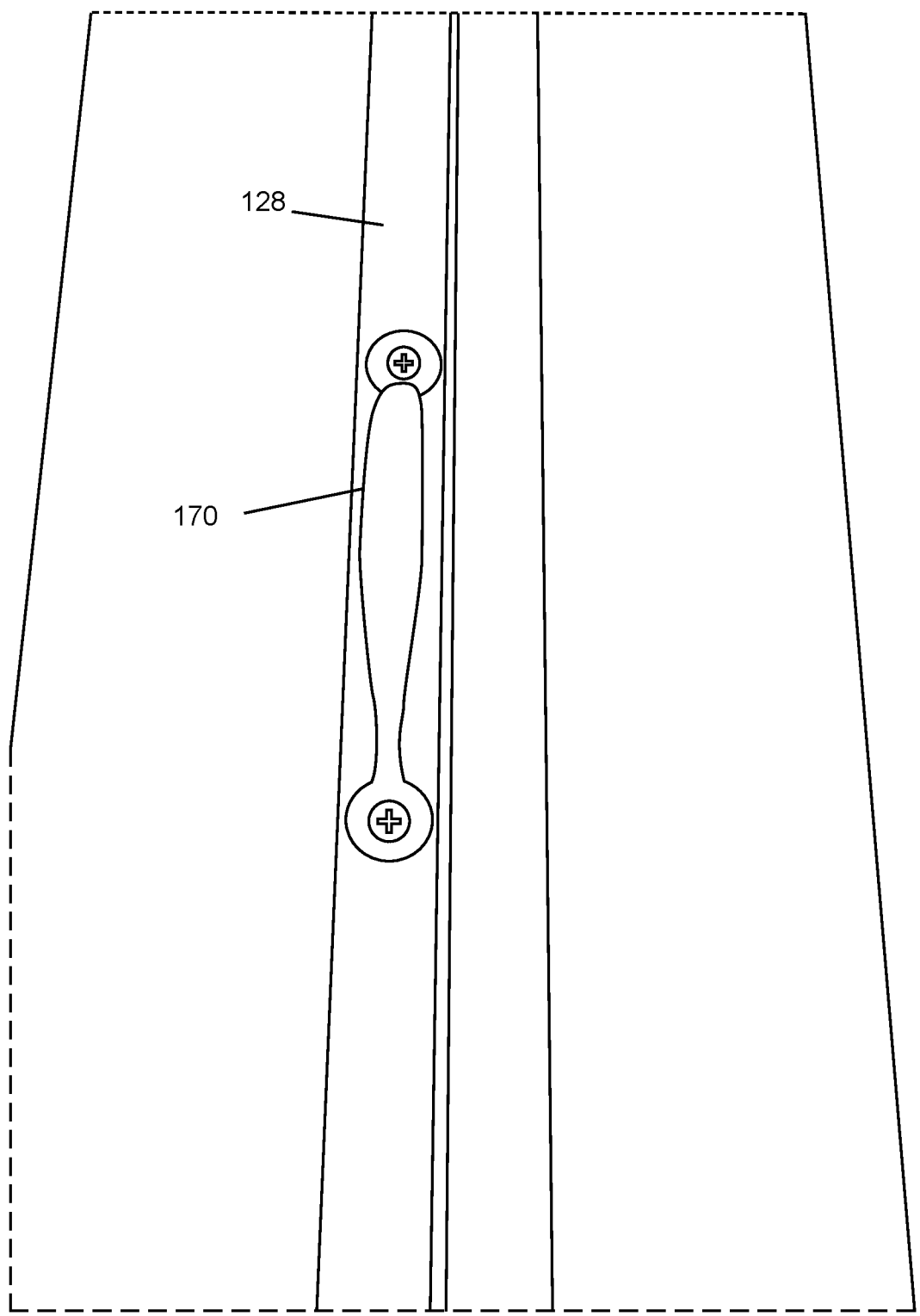
FIG. 22 is a perspective detail view of a fixed member of the second exemplary embodiment.

A portion of the fixed member 128 of the second exemplary embodiment (see 30, FIG. 5) is shown in connection with FIG. 22, wherein a carrying handle 170 is secured to the fixed member 128. One or more of these handles may be provided to assist in carrying the apparatus when in the collapsed mode, for example to operate in concert with the one or more shoulder straps.

Figure 23:
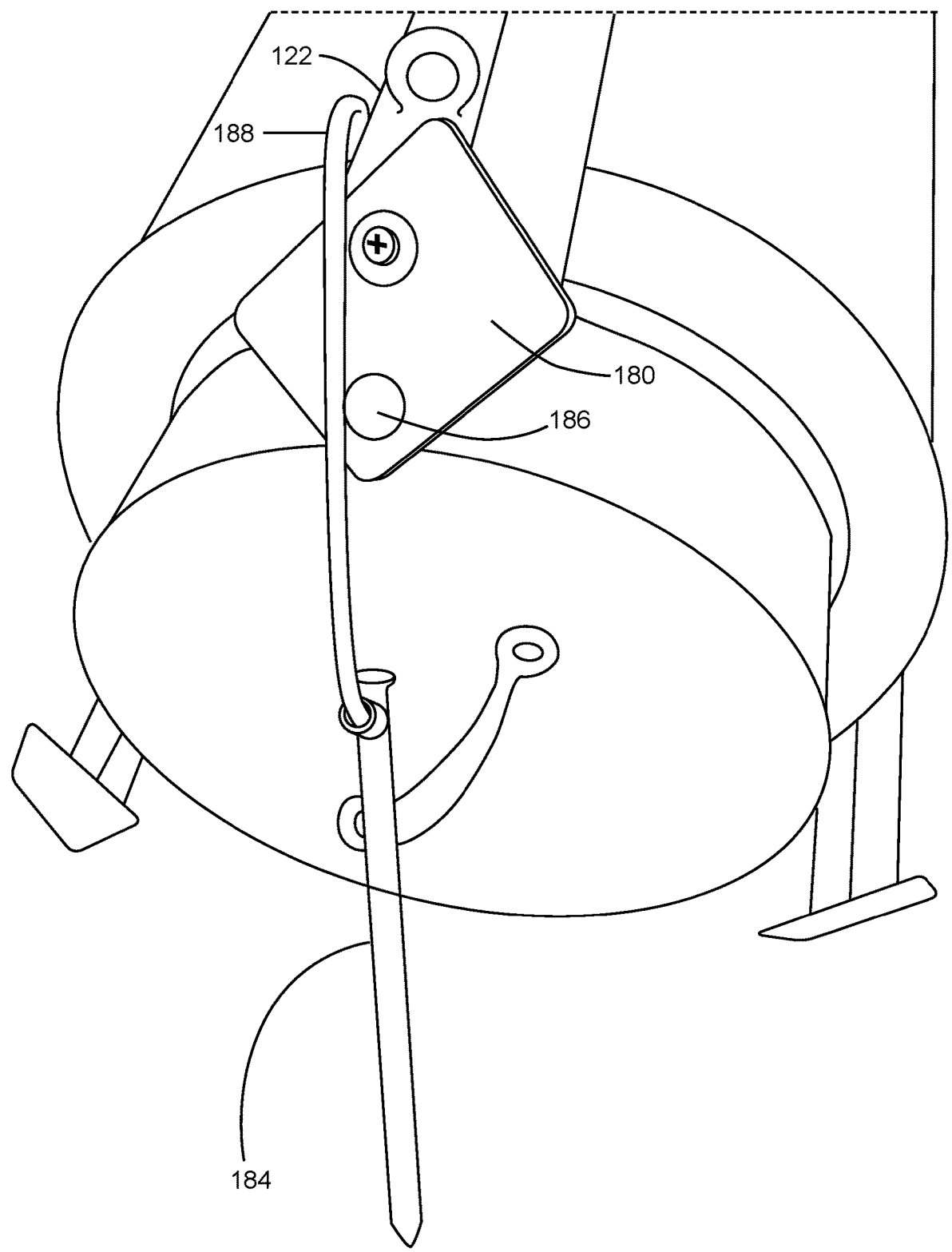
FIG. 23 is a perspective detail view of the distal end of a collapsible member of the second exemplary embodiment.

Other optional features are depicted in connection with FIG. 23, which depicts a foot flange 180 secured to the distal end of the collapsible member 122 of the collapsible leg. The foot flange (also depicted as 182 in connection with the first exemplary embodiment shown in FIG. 2) is provided to increase the surface area in contact with the ground when the device is configured in the deployed mode. This permits greater stability and traction with the ground surface when deployed without requiring an increased size (a corresponding weight) in the leg members themselves. FIG. 23 also illustrates an additional optional feature wherein leg stakes 184 are provided for each of the three or more collapsible legs. The leg stakes 184 may be optionally tethered (e.g., with tether 188) to a corresponding leg for storage, and may be provided with the ability to be stored inside of the hollow leg tubing. When the apparatus is deployed, the leg stakes 184 are installed into the ground through foot flange apertures 186 to further secure the apparatus in the desired feed distribution spot. Note that these apertures 186 are also visible with regard to the first exemplary embodiment (see e.g., FIG. 2) and may also serve as attachment means for hanging the apparatus in collapsed mode from a structure or natural overhanging element, such as a tree branch. Other useful features could be substituted at the distal end of the collapsible members, such as hooks or pivotable loops to readily provide versatility in deploying the apparatus in the intended environment. The collapsible members may also be each optionally provided with a telescoping portion wherein a length of the collapsible member is extendable.

Figure 24:
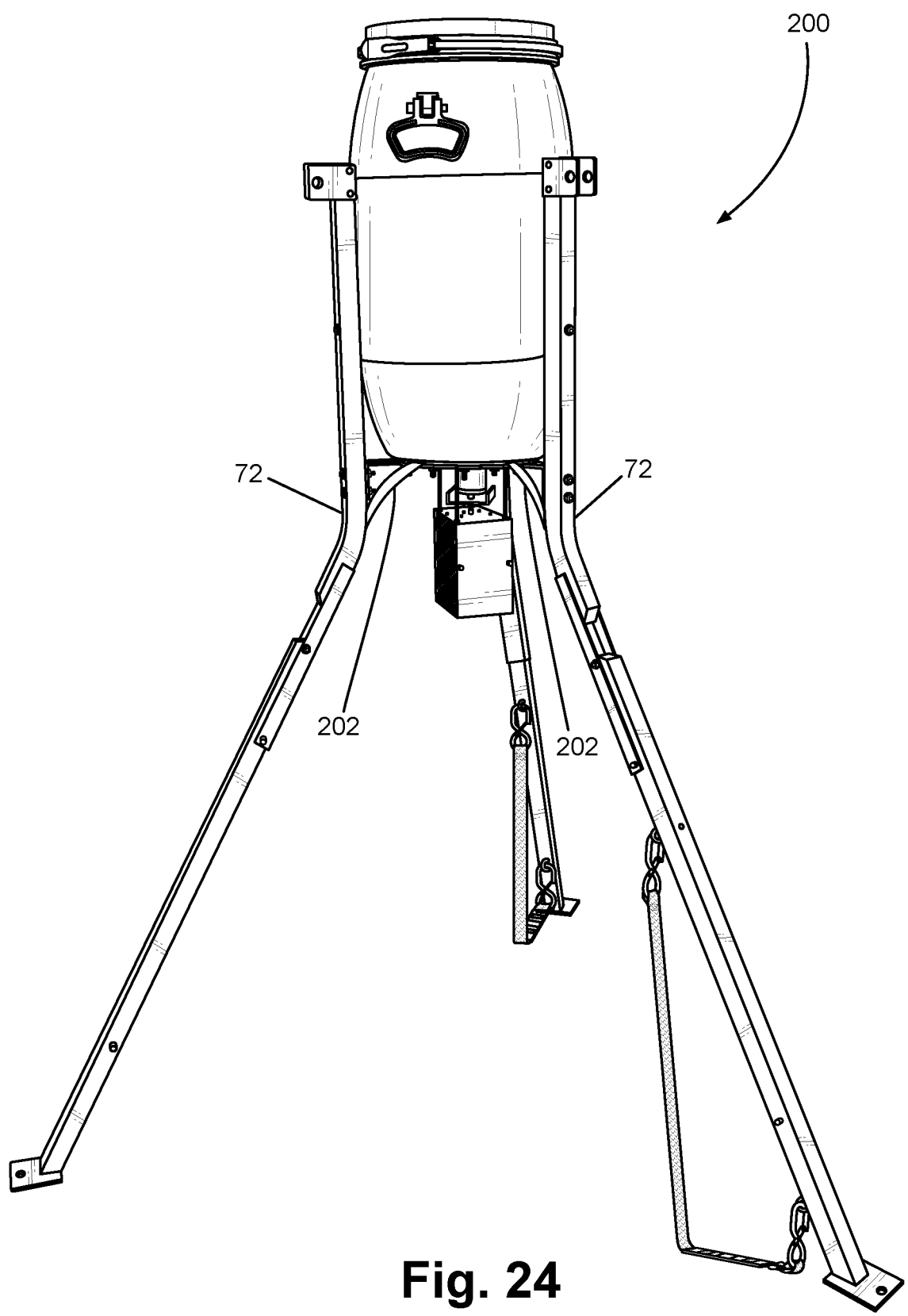
FIG. 24 is a perspective view of a third exemplary embodiment of the apparatus.

Turning to FIG. 24, a third exemplary embodiment of the invented game feeder is shown at 200. This apparatus 200, shown in deployed mode, is similar in construct to the first exemplary embodiment 2, with the exception that additional brackets or braces 202 are provided between the fixed member 72 and the pivot mounting plate (see e.g., 40, FIG. 6) or feed cavity 4, generally. The support braces 202 could also attach to or form part of the pivot bracket (see e.g., 82, FIG. 11). These elements may be desirable in order to increase the stability of the overall apparatus when in the deployed mode and subject to environmental variables such as winds, inclement weather generally, and interaction with animals.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A game feeder apparatus configurable between a collapsed mode and a deployed mode, said game feeder apparatus comprising:
    a feed cavity comprising:
        a top end;
        a bottom end;
        a perimeter sidewall extending from the top end to the bottom end and thereby forming a cavity; and
        an egress aperture positioned in the bottom end;
    a feed distributor secured to the feed cavity proximate the egress aperture; and
    a plurality of legs, wherein each leg in the plurality of legs comprises:
        a fixed member secured to the feed cavity comprising a proximal end and a distal end, wherein the proximal end of the fixed member extends below the feed distributor and wherein the distal end of the fixed member comprises a collapsed mode bracket comprising a pin aperture fixed with respect to the fixed member; and
        a collapsible member comprising:
            a proximal end rotatably fixed with respect to the proximal end of the fixed member at a pivot point; and
            a distal end comprising an outwardly spring-biased thumb pin corresponding to the pin aperture,
    wherein the collapsible member is rotatable about the pivot point between a folded position to configure the game feeder apparatus in the collapsed mode and an extended position to configure the game feeder apparatus in the deployed mode.

2. The game feeder apparatus of claim 1, wherein the feed cavity further comprises an ingress aperture positioned in the top end and a lid removably secured at the ingress aperture.

3. The game feeder apparatus of claim 1, wherein the pivot point for each leg in the plurality of legs is fixed with respect to a pivot bracket secured to the proximal end of the fixed member.

4. The game feeder apparatus of claim 3, wherein:
    the pivot bracket further comprises a pivot bracket aperture, and
    wherein the proximal end of the collapsible member comprises an outwardly spring-biased thumb pin corresponding to the pivot bracket aperture.

5. The game feeder apparatus of claim 1, wherein at least one leg in the plurality of legs further comprises at least two shoulder strap attachment points and a shoulder strap secured between the at least two shoulder strap attachment points.

6. The game feeder apparatus of claim 1, further comprising at least one shoulder strap secured between a first shoulder strap attachment point and a second shoulder strap attachment point.

7. The game feeder apparatus of claim 1, further comprising one or more hanging mounts secured with respect to the feed cavity from which said game feeder apparatus is suspendable.

8. The game feeder apparatus of claim 1, further comprising a mounting plate secured at the bottom end of the feed cavity, wherein the feed distributor is secured to the feed cavity via the mounting plate.

9. A game feeder apparatus configurable between a collapsed mode and a deployed mode, said game feeder apparatus comprising:
    a feed cavity comprising:
        a top end;
        a bottom end;
        a perimeter sidewall extending from the top end to the bottom end and thereby forming a cavity; and
        an egress aperture positioned in the bottom end;
    a feed distributor secured to the feed cavity proximate the egress aperture;

a plurality of legs, wherein each leg in the plurality of legs comprises:
    a fixed member secured to the feed cavity comprising a proximal end and a distal end, wherein the proximal end of the fixed member extends below the feed distributor and wherein the distal end of the fixed member comprises a collapsed mode bracket comprising a pin aperture fixed with respect to the fixed member; and
    a collapsible member comprising:
        a proximal end rotatably fixed with respect to the proximal end of the fixed member at a pivot point; and
        a distal end comprising an outwardly spring-biased thumb pin corresponding to the pin aperture; and
a means for rotating the collapsible member of each leg in the plurality of legs between a folded position to configure the game feeder apparatus in the collapsed mode and an extended position to configure the game feeder apparatus in the deployed mode.

10. The game feeder apparatus of claim 9, wherein the feed cavity further comprises an ingress aperture positioned in the top end and a lid removably secured at the ingress aperture.

11. The game feeder apparatus of claim 9, wherein the means for rotating the collapsible member of each leg in the plurality of legs between a folded position to configure the game feeder apparatus in the collapsed mode and an extended position to configure the game feeder apparatus in the deployed mode comprises a pivot bracket comprising a pivot bracket aperture, and wherein the proximal end of the collapsible member comprises an outwardly spring-biased thumb pin corresponding to the pivot bracket aperture.

12. The game feeder apparatus of claim 9, further comprising at least one shoulder strap secured between a first shoulder strap attachment point and a second shoulder strap attachment point.

13. The game feeder apparatus of claim 9, wherein the collapsible member for each leg in the plurality of legs further comprises a telescoping portion wherein a length of the collapsible member is extendable.

14. The game feeder apparatus of claim 9, further comprising one or more hanging mounts secured with respect to the feed cavity from which said game feeder apparatus is suspendable.

15. The game feeder apparatus of claim 9, further comprising a mounting plate secured at the bottom end of the feed cavity, wherein the feed distributor is secured to the feed cavity via the mounting plate.

16. A game feeder apparatus configurable between a collapsed mode and a deployed mode, said game feeder apparatus comprising:
    a feed cavity comprising:
        a top end;
        a bottom end;
        a perimeter sidewall extending from the top end to the bottom end and thereby forming a cavity;
        an ingress aperture positioned in the top end;
        a lid removably secured at the ingress aperture; and
        an egress aperture positioned in the bottom end;
    a feed distributor secured to the feed cavity proximate the egress aperture;
    a first leg comprising:
        a first fixed member secured to the perimeter sidewall of the feed cavity comprising a proximal end and a distal end, wherein the proximal end of the first fixed member extends below the feed distributor and wherein the first fixed member is fixed with respect to the feed cavity; and
        a first collapsible member comprising:
            a proximal end rotatably fixed with respect to the proximal end of the first fixed member at a first pivot point; and
            a distal end;
    a second leg comprising:
        a second fixed member secured to the perimeter sidewall of the feed cavity comprising a proximal end and a distal end, wherein the proximal end of the second fixed member extends below the feed distributor and wherein the second fixed member is fixed with respect to the feed cavity; and
        a second collapsible member comprising:
            a proximal end rotatably fixed with respect to the proximal end of the second fixed member at a second pivot point; and
            a distal end;
    a third leg comprising:
        a third fixed member secured to the perimeter sidewall of the feed cavity comprising a proximal end and a distal end, wherein the proximal end of the third fixed member extends below the feed distributor and wherein the third fixed member is fixed with respect to the feed cavity; and
        a third collapsible member comprising:
            a proximal end rotatably fixed with respect to the proximal end of the third fixed member at a third pivot point; and
            a distal end,
    at least one shoulder strap secured between a first shoulder strap attachment point and a second shoulder strap attachment point;
    one or more hanging mounts secured with respect to the feed cavity from which said game feeder apparatus is suspendable; and
    a first, second and third telescoping portion for each of the first, second and third collapsible members, respectively, wherein a length of the collapsible member is extendable,
wherein the first collapsible member is rotatable about the first pivot point, the second collapsible member is rotatable about the second pivot point and the third collapsible member is rotatable about the third pivot point, to a folded position to configure the game feeder apparatus in the collapsed mode and an extended position to configure the game feeder apparatus in the deployed mode.

* * * * *